US012749453B2

(12) United States Patent
Shin et al.

(10) Patent No.: US 12,749,453 B2
(45) Date of Patent: Sep. 29, 2026

(54) DISPLAY APPARATUS

(71) Applicant: LG Display Co., Ltd., Seoul (KR)

(72) Inventors: Seung Hwan Shin, Paju-si (KR); Hwa Young Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/039,227

(22) Filed: Jan. 28, 2025

(65) Prior Publication Data

US 2025/0279064 A1 Sep. 4, 2025

(30) Foreign Application Priority Data

Feb. 29, 2024 (KR) ........................ 10-2024-0029922

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/062* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2024/0355259 A1* 10/2024 Chien .................. G09G 3/3677
2025/0006133 A1* 1/2025 Feng .................... G09G 3/3233

FOREIGN PATENT DOCUMENTS

KR 10-2012-0088971 A 8/2012
KR 10-2021-0080996 A 7/2021

* cited by examiner

*Primary Examiner* — Christopher J Kohlman
(74) *Attorney, Agent, or Firm* — Seed Intellectual Property Law Group LLP

(57) ABSTRACT

A display apparatus includes a display panel in which a plurality of data lines, a plurality of gate lines, and a plurality of pixels are arranged, and the plurality of gate lines is divided into at least two regions and separately driven, at least two gate drivers configured to supply scan signals at different frequencies to the plurality of gate lines of the divided regions, a data driver configured to supply data signals to the plurality of data lines, and a controller configured to control the at least two gate drivers such that the at least two gate drivers output scan signals at different frequencies.

20 Claims, 12 Drawing Sheets

DISPLAY APPARATUS

CROSS-REFERENCE TO RELATED APPLICATION(S)

This application claims the benefit of Korean Patent Application No. 10-2024-0029922, filed on Feb. 29, 2024, which is hereby incorporated by reference as if fully set forth herein.

BACKGROUND

Technical Field

The present disclosure relates to a display apparatus.

Description of the Related Art

Image display devices that realize various types of information on screens are core technology of the information and communication era and are developing to become thinner, lighter, more portable, and higher performance. Accordingly, display devices that can be manufactured in a lightweight and thin form are in the spotlight.

Specific examples of such display devices include a liquid crystal display (LCD), a quantum dot display (QD), a field emission display (FED), and an organic light emitting diode (OLED) device.

OLED devices are self-luminous display devices that are advantageous in terms of power consumption due to low voltage operation and have excellent color implementation, high response speed, wide viewing angle, and high contrast ratio (CR), and therefore, they are being actively studied as displays.

Such display devices include a data driver, a gate driver, and pixels. The data driver provides data signals to pixels through data lines. The gate driver generates gate signals using externally provided gate power and clock signals and sequentially provides gate signals to pixels through gate lines.

Each pixel can record a data signal relevant thereto in response to a gate signal and emit light in response to the data signal.

Such a display device is used as a display device for a dashboard of an automobile. The dashboard of an automobile can be divided into a first region for displaying speed, driving distance, RPM, etc., a second region for displaying navigation, and a third region for displaying weather, time, news, etc.

BRIEF SUMMARY

The present disclosure is directed to a display apparatus that substantially obviates one or more problems due to limitations and disadvantages of the related art.

The present disclosure provides a display apparatus that can be driven by separate driving frequencies suitable for functions of upper, lower, left, and right regions of a display panel.

The features of the present disclosure is not limited to those mentioned above, and other features not mentioned can be clearly understood by those skilled in the art from the description below.

Additional technical characteristics, improvements, and features of the present disclosure will be set forth in part in the description which follows and in part will become apparent to those having ordinary skill in the art upon examination of the following or may be learned from practice of the present disclosure. The features and other improvements of the present disclosure may be realized and attained by the structure particularly pointed out in the written description and claims hereof as well as the appended drawings.

As embodied and broadly described herein, a display apparatus includes a display panel in which a plurality of data lines, a plurality of gate lines, and a plurality of pixels are arranged, and the plurality of gate lines is divided into at least two regions and separately driven in up, down, left, and right directions, at least two gate drivers configured to supply scan signals at different frequencies to the plurality of gate lines of the divided regions, a data driver configured to supply data signals to the plurality of data lines, and a controller configured to control the at least two gate drivers such that the at least two gate drivers output scan signals at different frequencies.

Specific details of other embodiments are included in the detailed description and drawings.

BRIEF DESCRIPTION OF THE SEVERAL VIEWS OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
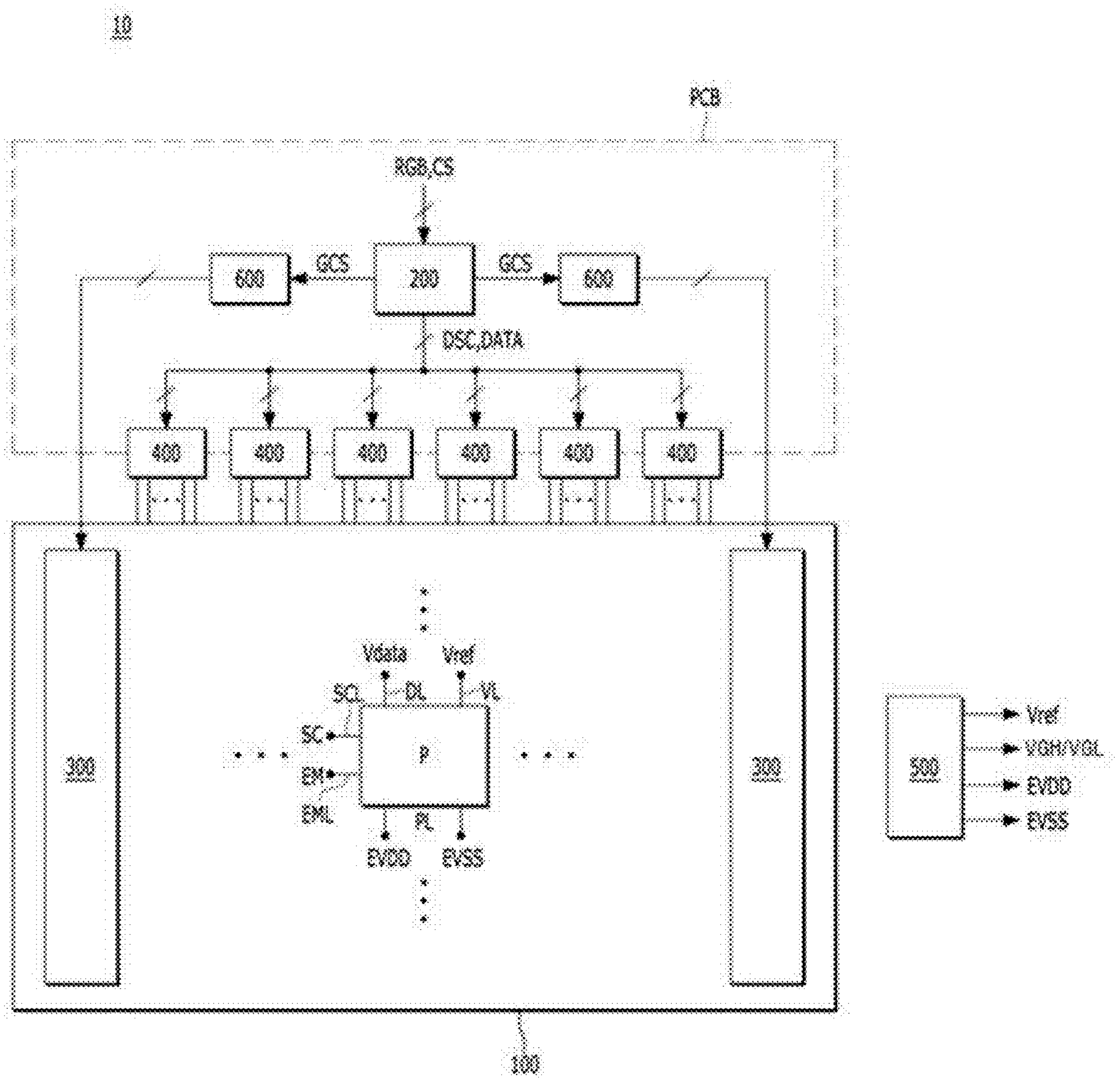
FIG. 1 is a block diagram showing a display apparatus according to an embodiment of the present disclosure.

Hereinafter, example embodiments of the present disclosure will be described with reference to the attached drawings. Throughout the specification, the same reference numerals refer to substantially the same components.

In the following description, if it is determined that a detailed description of known techniques associated with the present disclosure would unnecessarily obscure the gist of the present disclosure, detailed description thereof will be omitted. In addition, the component names used in the following description are selected in consideration of the ease of writing the specification, and may differ from the names of parts of the actual product.

Shapes, sizes, ratios, angles, numbers, etc., shown in the figures to describe embodiments of the present disclosure are exemplary and thus are not limited to particulars shown in the figures. Like numbers refer to like elements throughout the specification.

In the following description, if it is determined that a detailed description of known techniques associated with the present disclosure would unnecessarily obscure the gist of the present disclosure, detailed description thereof will be omitted.

It will be further understood that, when the terms “include,” “have” and “comprise” are used in the present disclosure, other parts may be added unless “~only” is used. An element described in the singular form is intended to include a plurality of elements unless context clearly indicates otherwise.

In interpretation of a component, the component is interpreted as including an error range unless otherwise explicitly described.

In describing various embodiments of the present disclosure, for example, when describing a positional relationship between two parts using “on,” “above,” “under,” “by,” or the like, one or more other parts may be located between the two parts unless “right” or “directly” is used.

In describing various embodiments of the present disclosure, for example, when describing a temporal chronological relationship between events using “after,” “subsequently to,” “next to,” “before,” or the like, cases where events are not continuous may also be included unless “right” or “directly” is used.

In the following description of various embodiments, “first” and “second” are used to describe various components, but such components are not limited by these terms. The terms are used to discriminate one component from another component. Accordingly, a first component mentioned in the following description may be a second component within the technical spirit of the present disclosure.

The features within various embodiments of the present disclosure may be partially or wholly combined with one another, and may be technically capable of various interconnections and operations, and the various embodiments may be implemented independently or may be implemented together in a related relationship.

Hereinafter, a display apparatus according to an embodiment of the present disclosure will be described with reference to the drawings.

FIG. 1 is a block diagram showing a display apparatus according to an embodiment of the present disclosure.

The display apparatus 10 according to an embodiment of the present disclosure includes a display panel 100 including a plurality of pixels P, a controller 200, a gate driver 300 that supplies a gate signal to each of the plurality of pixels P, a data driver 400 that supplies a data signal to each of the plurality of pixels P, a power supply 500 that supplies power to drive each of the plurality of pixels P, a level shifter 600 that adjusts the level of a gate signal applied to the gate driver 300, and a sensing unit (not shown) that senses deterioration of the plurality of pixels P. Here, the controller 200, the gate driver 300, the data driver 400, and the sensing unit may be collectively referred to as a control unit.

The display panel 100 may include a display area (AA, refer to FIG. 2) in which the pixels P are disposed, and a non-display area NA provided to surround the display area AA, in which the gate driver 300 and the data driver 400 are disposed. In an embodiment, the gate driver 300 also may be disposed in the display area AA.

In the display panel 100, a plurality of gate lines GL and a plurality of data lines DL intersect each other, and the plurality of pixels P is connected to the gate lines GL and the data lines DL. Specifically, one pixel P receives a gate signal from the gate driver 300 through the gate line GL connected thereto, receives a data signal from the data driver 400 through the data line DL connected thereto, and receives a high-level driving voltage EVDD and a low-level driving voltage EVSS from the power supply 500 through a driving voltage line PL.

Here, the gate lines GL are provided to supply a scan signal SC and an emission control signal EM, and the data lines DL are provided to supply a data voltage Vdata. In addition, according to various embodiments, the gate lines GL may include a plurality of scan lines SCL provided to supply the scan signal SC and an emission control line EML provided to supply the emission control signal EM. In addition, the plurality of pixels P may additionally include a power line VL to receive a reference voltage Vref and an initialization voltage Vini.

Figure 2:
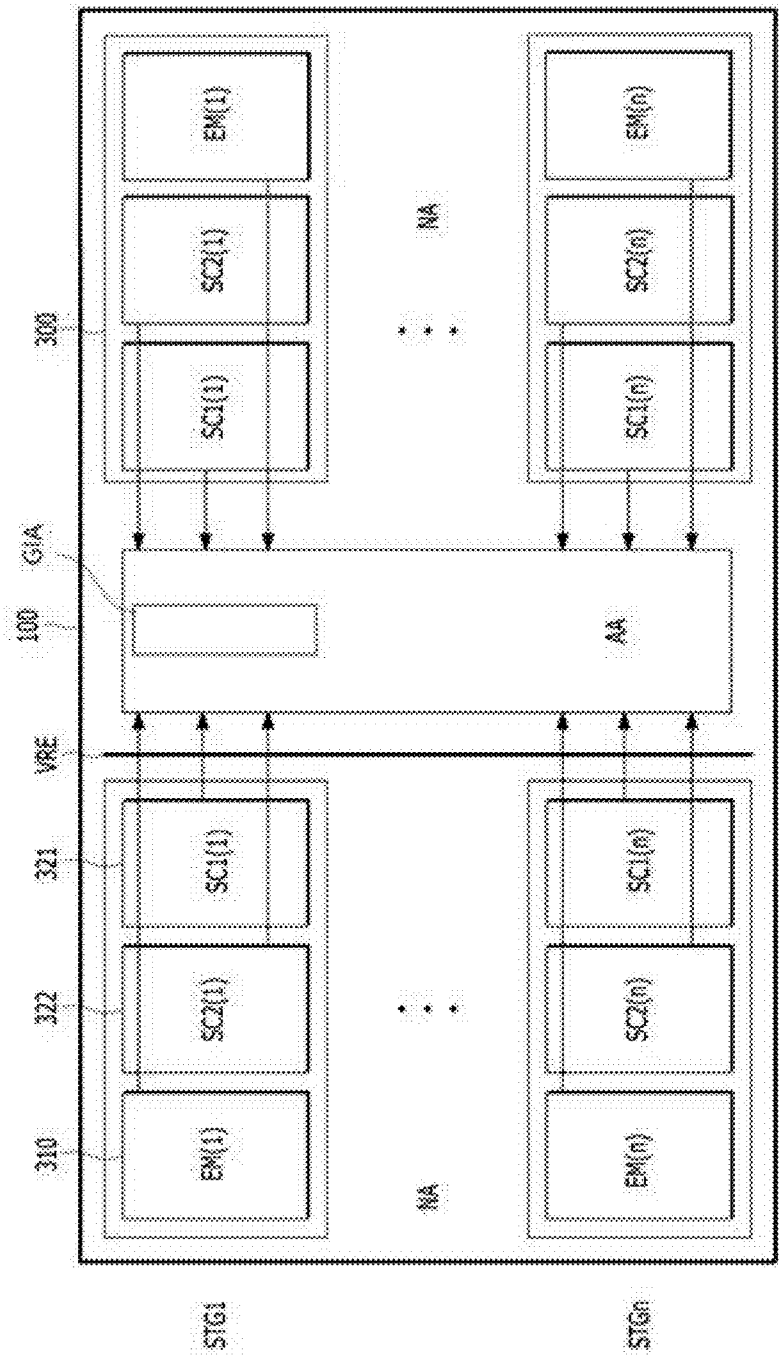
FIG. 2 is a block diagram showing a configuration of a gate driver in the display apparatus according to an embodiment of the present disclosure.
Figure 4:
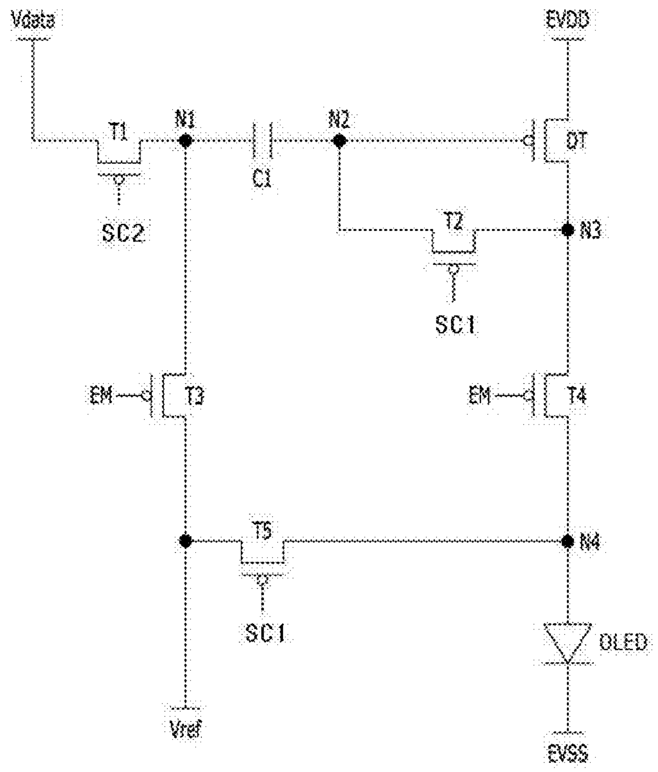
FIG. 4 is a circuit diagram showing a pixel circuit in the display apparatus according to an embodiment of the present disclosure.

In addition, each pixel P includes a light-emitting element OLED and a pixel circuit that controls operation of the light-emitting element OLED, as illustrated in FIG. 2 and FIG. 4. Here, the light-emitting element OLED may be composed of an anode ANO, a cathode CAT, and an emission layer EL interposed between the anode ANO and the cathode CAT.

The pixel circuit includes a plurality of switching elements, a driving element, and a capacitor. Here, the switching elements and the driving element may be composed of thin film transistors. In the pixel circuit, the driving element controls the amount of current supplied to the light-emitting element OLED according to the data voltage Vdata to adjust the amount of light emitted from the light-emitting element OLED. Further, the plurality of switching elements receives the scan signal (SC) supplied through the plurality of scan lines SCL and the emission control signal EM supplied through the emission control line EML to operate the pixel circuit.

The display panel 100 may be implemented as a non-transmissive display panel or a transmissive display panel. The transmissive display panel may be applied to a transparent display apparatus in which an image is displayed on a screen and an actual object in the background is visible.

The display panel 100 may be manufactured as a flexible display panel. The flexible display panel may be implemented as an organic light-emitting display panel using a plastic substrate.

Each pixel P may be divided into a red pixel, a green pixel, and a blue pixel for displaying colors. Each pixel P may further include a white pixel. Each pixel P includes a pixel circuit.

Touch sensors may be arranged on the display panel 100. Touch input may be sensed using separate touch sensors or through the pixels P. The touch sensors may be arranged on the screen of the display panel in the form of an on-cell type or an add on type, or built into the display panel 100 in the form of an in-cell type.

The controller 200 processes image data RGB input from the outside such that the image data RGB becomes suitable to the size and resolution of the display panel 100 and supplies the processed image data RGB to the data driver 400. The controller 200 generates a gate control signal GCS and a data control signal DCS using timing signals CS input from the outside, such as a dot clock signal CLK, a data enable signal DE, a horizontal synchronization signal Hsync, and a vertical synchronization signal Vsync. The controller 200 controls the gate driver 300 and the data driver 400 by supplying the generated gate control signal GCS and data control signal DCS to the gate driver 300 and the data driver 400.

The controller 200 may be configured to be combined with various processors, such as a microprocessor, a mobile processor, and an application processor, depending on the device on which the controller 200 is mounted.

A host system may be any one of a television TV system, a set-top box, a navigation system, a personal computer (PC), a home theater system, a mobile device, a wearable device, and a vehicle system.

The controller 200 may control an operation timing of a display panel driver by multiplying an input frame frequency by i and using a frame frequency of the input frame frequency×i (i being a positive integer greater than 0) Hz. The input frame frequency is 60 Hz in the National Television Standards Committee (NTSC) mode and 50 Hz in the Phase-Alternating Line (PAL) mode.

The controller 200 generates signals such that the pixels P can operate at various refresh rates. That is, the controller 200 generates signals related to operation of the pixels such that the pixels P can operate in a variable refresh rate (VRR) mode or switchably between a first refresh rate and a second refresh rate. For example, the controller 200 may operate the pixels P at various refresh rates by simply changing the rate of a clock signal, generating a synchronization signal such that a horizontal blank or a vertical blank is generated, or operating the gate driver 300 in a mask manner.

The controller 200 generates the gate control signal GCS for controlling the operation timing of the gate driver 300 and the data control signal DSC for controlling the operation timing of the data driver 400 on the basis of a timing signal CS received from the host system.

The data driver 400 receives image data DATA and the data control signal DCS from the controller 200. The data driver 400 converts the image data DATA into a gamma compensated voltage in response to the data control signal DCS from the controller 200 to generate a data voltage Vdata, and supplies the data voltage Vdata to the data lines DL of the display panel 100 in synchronization with the scan signal SC. The data driver 400 may be connected to the data lines of the display panel 100 through a chip-on-glass (COG) process or a tape automated bonding (TAB) process.

The gate driver 300 operates according to the gate control signal GCS input from the level shifter 600 to generate a gate signal. Then, the gate driver 300 sequentially supplies the gate signal to the gate lines GL. The gate driver 300 may be formed directly on the lower substrate of the display panel 100 in a gate driver-in-panel (GIP) structure. The gate driver 300 may be formed in the display area AA in which a screen is displayed in the display panel 100, or may be formed in the non-display area NA outside the display area AA. The non-display area NA may include a bezel area, or may be the same as the bezel area. In the GIP structure, the level shifter 600 may be mounted on a printed circuit board PCB along with the controller 200.

The power supply 500 generates DC power to operate a pixel array of the display panel 100 and the display panel driver using a DC-DC converter. The DC-DC converter may include a charge pump, a regulator, a buck converter, a boost converter, etc. The power supply 500 may receive a DC input voltage supplied from a host system (not shown) and generate DC voltages such as gate-on voltages VGL and VEL, gate-off voltages VGH and VEH, a high-level driving voltage EVDD, and a low-level driving voltage EVSS. The gate-on voltages VGL and VEL and the gate-off voltages VGH and VEH are supplied to a level shifter (not shown) and the gate driver 300. The high-level driving voltage EVDD and the low-level driving voltage EVSS are supplied in common to the pixels P.

The level shifter 600 boosts a transistor-transistor-logic (TTL) level voltage of the gate control signal GCS input from the controller 200 to a gate high voltage VGH and a gate low voltage VGL that can operate TFTs formed on the display panel 100 and supplies the boosted voltage to the gate driver 300. The gate control signal GCS may include a start signal, a clock signal, etc.

The display apparatus 10 is used as a display apparatus of a dashboard of an automobile. The dashboard of an automobile may include a cluster area in which the driving speed, driving distance, and the like of the automobile are displayed, a CID area in which navigation and the like are displayed, and a CDD area in which music, weather, time, news, and the like are displayed.

Therefore, the display apparatus for automobiles may be formed in a laterally long shape. Since the display apparatus is formed in a laterally long shape, the gate lines may be disposed relatively long. Accordingly, the level shifter for transmitting a gate signal may be used.

The plurality of pixels P of the display panel 100 may include at least a first pixel, a second pixel, and a third pixel. The first pixel, the second pixel, and the third pixel may emit light of different colors. For example, the first pixel may be a red pixel, the second pixel may be a green pixel, and the third pixel may be a blue pixel.

The sizes of the plurality of pixels P may be the same or different. The first pixel, the second pixel, and the third pixel may be designed to have different sizes in consideration of the lifespan of the light-emitting element OLED included in each of the first pixel, the second pixel, and the third pixel, or color balance.

FIG. 2 is a block diagram showing a configuration of the gate driver in the display apparatus according to an embodiment of the present disclosure.

The gate driver 300 may include an emission control signal driver 310, a first scan driver 321, and a second scan driver 322. Shift registers constituting the gate driver 300 may be configured to be located on both sides of the display area AA. The shift registers on both sides may include the emission control signal driver 310, the first scan driver 321, and the second scan driver 322. However, this is merely an example, and the gate driver 300 may vary depending on the circuit configuration and driving method of sub-pixels disposed in the display area AA.

Stages STG1 to STGn of the shift registers may include first scan signal generators SC1(1) to SC1(*n*), second scan signal generators SC2(1) to SC2(*n*), and emission control signal generators EM(1) to EM(n). In FIG. 2, the N-th stage STGn of the shift registers is illustrated as the last stage. However, at least one dummy stage may be positioned in front of the first stage STG1 of the shift registers and behind the N-th stage STGn of the shift registers.

The first scan signal generators SC1(1) to SC1(*n*) may output the first scan signal through the first scan line of the display panel 100. The second scan signal generators SC2(1) to SC2(*n*) may output the second scan signal through the second scan line of the display panel 100. The emission control signal generators EM(1) to EM(n) may output the emission control signal through the emission control line of the display panel 100.

Although the reference voltage line VRE is illustrated as being located only on the left side of the display area AA in FIG. 2, the present disclosure is not limited thereto, and the reference voltage line VRE may be located on both sides or a plurality of reference voltage lines may be provided. In addition, although the emission control signal generators EM(1) to EM(n) are illustrated as being located only on the left side of the display area AA in FIG. 2, but the present disclosure is not limited thereto, and the emission control signal generators may be located on both sides.

Further, although the emission control signal generators EM(1) to EM(n) are illustrated as being disposed on the outermost side, the present disclosure is not limited thereto, and the positions of the first scan signal generators SC1(1) to SC1(*n*), the second scan signal generators SC2(1) to SC2(*n*), and the emission control signal generators EM(1) to EM(n) may be changed in various manners.

The shift registers constituting the gate driver 300 may be disposed on the inner side of the display area AA. That is, the elements constituting the gate driver 300 may be disposed between the plurality of pixels P in the display area AA. This may be referred to as a GIA (GIP in Array).

Figure 3:
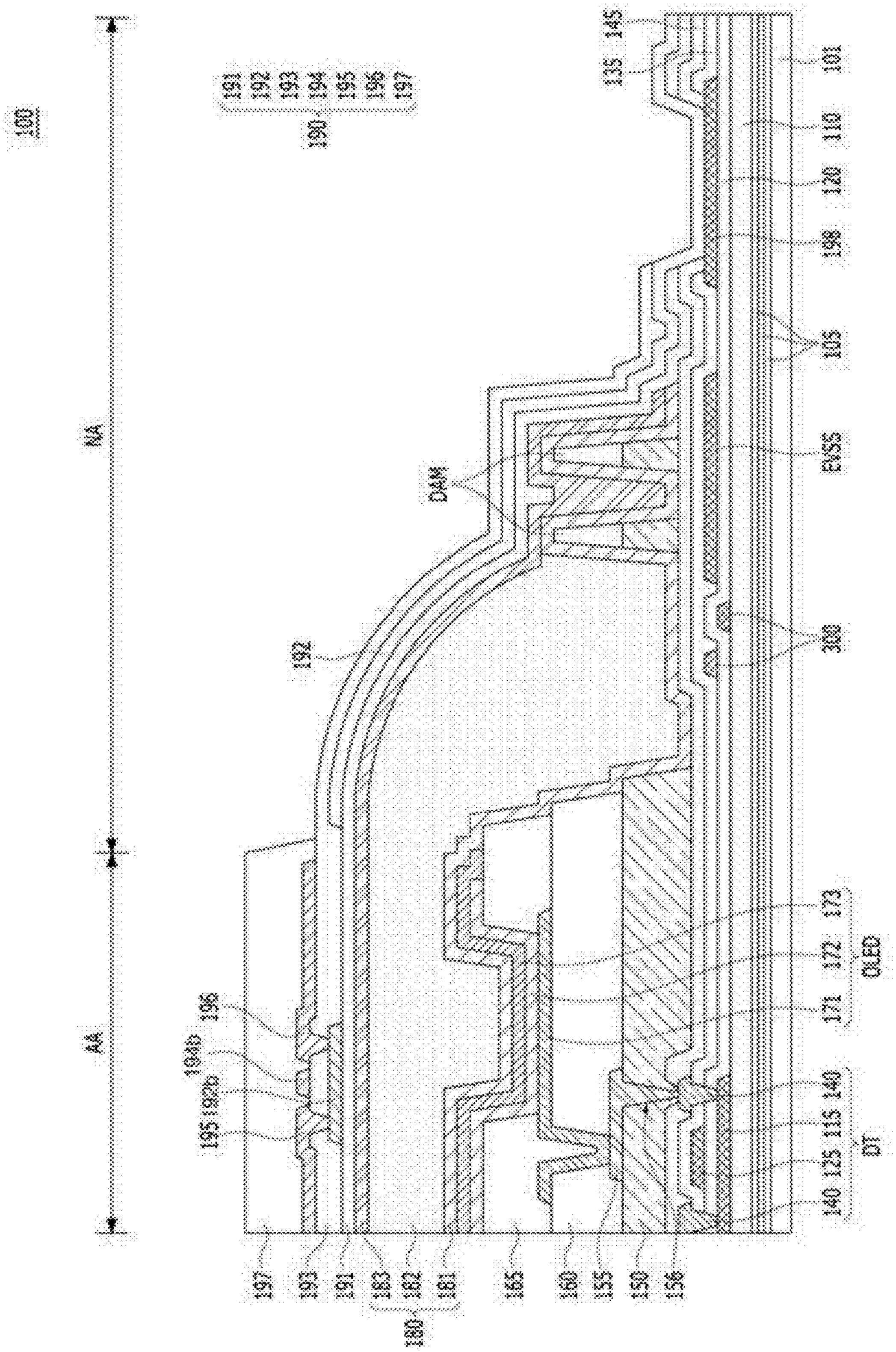
FIG. 3 is a cross-sectional view showing a laminated structure of a display panel according to an embodiment of the present disclosure.

FIG. 3 is a cross-sectional view showing a laminated structure of the display panel according to an embodiment of the present disclosure.

As shown in FIG. 3, a driving transistor DT for driving a light-emitting element OLED disposed in the display area AA may be arranged on a substrate 101 of the display panel 100. The driving transistor DT may include a semiconductor layer 115, a gate electrode 125, and source and drain electrodes 140. For convenience of description, only the driving transistor DT among various thin film transistors that may be included in a sub-pixel driving circuit is illustrated, but other thin film transistors such as a switching transistor may also be included in the sub-pixel driving circuit. In addition, although the driving transistor DT is described as having a coplanar structure in the present disclosure, the thin film transistor may be implemented in other structures such as a staggered structure, and thus the embodiment is not limited thereto.

At least some of the driving transistors DT and switching transistors included in the sub-pixel driving circuit may use an oxide semiconductor as an active layer. A thin film transistor using an oxide semiconductor material as an active layer has an excellent leakage current blocking effect and is relatively inexpensive to manufacture compared to a thin film transistor using a polycrystalline semiconductor material as an active layer. Therefore, in order to reduce power consumption and decrease manufacturing costs, the sub-pixel driving circuit may include a driving transistor DT using an oxide semiconductor material and at least one switching transistor.

All of the thin film transistors constituting the sub-pixel driving circuit may be implemented using an oxide semiconductor material, or only some switching transistors may be implemented using an oxide semiconductor material. However, it is difficult to secure reliability in a thin film transistor using an oxide semiconductor material, and a thin film transistor using a polycrystalline semiconductor material has a high operating speed and excellent reliability. Therefore, an embodiment of the present disclosure may include both a switching thin film transistor using an oxide semiconductor material and a switching transistor using a polycrystalline semiconductor material.

The driving transistor DT may control the amount of light emitted from the light-emitting element OLED by receiving the high-level voltage EVDD in response to a data signal supplied to the gate electrode 125 thereof and controlling the current supplied to the light-emitting element OLED, and supply a constant current until the data signal of the next frame is supplied by a voltage charged in a storage capacitor (not shown) such that the light-emitting element OLED can maintain light emission. A high-level voltage supply line may be formed parallel to the data lines.

The driving transistor DT may include the semiconductor layer 115 disposed on a first insulating layer 110, the gate electrode 125 superposed on the semiconductor layer 115 with a second insulating layer 120 interposed therebetween, and the source and drain electrodes 140 formed on a third insulating layer 135 and in contact with the semiconductor layer 115.

The semiconductor layer 115 may be a region where a channel of the driving transistor DT is formed. The semiconductor layer 115 may be formed of an oxide semiconductor, or may be formed of various organic semiconductors such as amorphous silicon (a-Si), polycrystalline silicon (poly-Si), and pentacene, and thus the embodiment is not limited thereto. The semiconductor layer 115 may be formed on the first insulating layer 110. The semiconductor layer 115 may have a channel region, a source region, and a drain region. The channel region may overlap with the gate electrode 125 with the second insulating layer 120 interposed therebetween. The channel region may be formed between the source region and the drain region.

The source region may be electrically connected to the source electrode 140 through a contact hole penetrating the second insulating layer 120 and the third insulating layer 135. The drain region may be electrically connected to the drain electrode 140 through a contact hole penetrating the second insulating layer 120 and the third insulating layer 135. A buffer layer 105 and the first insulating layer 110 may be disposed between the semiconductor layer 115 and the substrate 101. The buffer layer 105 may delay diffusion of moisture and/or oxygen that has penetrated into the substrate 101. The first insulating layer 110 may protect the semiconductor layer 115 and block various types of defects introduced from the substrate 101.

The uppermost layer of the buffer layer 105 in contact with the first insulating layer 110 may be formed of a material having different etching characteristics from the remaining layers of the buffer layer 105, the first insulating layer 110, the second insulating layer 120, and the third insulating layer 135. The uppermost layer of the buffer layer 105 in contact with the first insulating layer 110 may be formed of one of silicon nitride (SiNx) and silicon oxide (SiOx). The remaining layers of the buffer layer 105, the first insulating layer 110, the second insulating layer 120, and the third insulating layer 135 may be formed of the other one of silicon nitride (SiNx) and silicon oxide (SiOx). For example, the uppermost layer of the buffer layer 105 in contact with the first insulating layer 110 may be formed of silicon nitride (SiNx) and the remaining layers of the buffer layer 105, the first insulating layer 110, the second insulating layer 120, and the third insulating layer 135 may be formed of silicon oxide (SiOx), but the embodiment is not limited thereto.

The gate electrode 125 is formed on the second insulating layer 120 and may be superposed on the channel region of the semiconductor layer 115 with the second insulating layer 120 interposed therebetween. The gate electrode 125 may be formed of a first conductive material that is a single layer or multiple layers made of one of magnesium (Mg), molybdenum (Mo), aluminum (Al), chromium (Cr), gold (Au), titanium (Ti), nickel (Ni), neodymium (Nd), and copper (Cu), or an alloy thereof, but the embodiment is not limited thereto.

The source electrode 140 may be connected to the source region of the semiconductor layer 115 through the contact hole penetrating the second insulating layer 120 and the third insulating layer 135. The drain electrode 140 faces the source electrode 140 and may be connected to the drain region of the semiconductor layer 115 through the contact hole penetrating the second insulating layer 120 and the third insulating layer 135.

The source region and the drain region may be conductive regions formed of an intrinsic polycrystalline semiconductor material doped with a group-5 or group-3 impurity ion, for example, phosphorus (P) or boron (B), at a predetermined concentration. The channel region may provide a path for electrons or holes to move by maintaining the intrinsic state of the polycrystalline semiconductor material or oxide semiconductor material.

The source and drain electrodes 140 may be formed of a second conductive material that is a single layer or multiple layers of one or more alloys of molybdenum (Mo), aluminum (Al), chromium (Cr), gold (Au), titanium (Ti), nickel (Ni), neodymium (Nd), and copper (Cu), but the embodiment is not limited thereto.

A connection electrode 155 may be arranged between a first intermediate layer 150 and a second intermediate layer 160. The connection electrode 155 may be exposed through a connection electrode contact hole 156 penetrating a protective film 145 and the first intermediate layer 150 to be connected to the drain electrode 140. The connection electrode 155 may be formed of a material having a low resistivity that is the same as or similar to that of the drain electrode 140, but the embodiment is not limited thereto.

A light-emitting element OLED including an emission layer 172 may be arranged on the second intermediate layer 160 and a bank layer 165. The light-emitting element OLED may include an anode 171, at least one emission layer 172 formed on the anode 171, and a cathode 173 formed on the emission layer 172.

The anode 171 may be disposed on the second intermediate layer 160. The anode 171 may be electrically connected to the connection electrode 155 through a contact hole penetrating the second intermediate layer 160.

The anode 171 may be formed to be exposed by the bank layer 165. The bank layer 165 can define an emission region. The bank layer 165 may also be formed of an opaque material (e.g., black) to prevent optical interference between adjacent sub-pixels. In this case, the bank layer 165 may include a light-shielding material that is at least one of a color pigment, organic black, or carbon, but the embodiment is not limited thereto.

The at least one emission layer 172 may be formed on the anode 171 of the emission region provided by the bank layer 165. The at least one emission layer 172 includes a hole transport layer, a hole injection layer, a hole blocking layer, the emission layer 172, an electron injection layer, an electron blocking layer, and an electron transport layer on the anode 171, which may be sequentially or reversely laminated depending on the light-emitting direction. In addition, the emission layer 172 may include first and second emission stacks facing each other with a charge generation layer interposed therebetween. In this case, one emission layer 172 of the first and second emission stacks generates blue light, and the other emission layer 172 of the first and second emission stacks generates yellow-green light, and thus white light may be generated through the first and second emission stacks. The white light generated from the emission stacks is incident on a color filter located above or below the emission layer 172, and thus a color image can be formed. As another example, a color image may be formed by generating color light corresponding to each pixel in each emission layer 172 without a separate color filter. For example, the emission layer 172 of a red sub-pixel may generate red light, the emission layer 172 of a green sub-pixel may generate green light, and the emission layer 172 of a blue sub-pixel may generate blue light. The cathode 173 may be formed to face the anode 171 with the emission layer 172 interposed therebetween.

An encapsulation member 180 can block external moisture or oxygen from penetrating into the light-emitting element OLED. To this end, the encapsulation member 180 may have at least one inorganic encapsulation layer and at least one organic encapsulation layer, but the embodiment is not limited thereto. In the present disclosure, an example of a structure of the encapsulation member 180 in which a first encapsulation layer 181, a second encapsulation layer 182, and a third encapsulation layer 183 are sequentially laminated will be described.

The first encapsulation layer 181 may be formed on the substrate 101 on which the cathode 173 is formed. The third encapsulation layer 183 may be formed on the substrate 101 on which the second encapsulation layer 182 is formed and may be formed to surround the upper surface, lower surface, and side surface of the second encapsulation layer 182 along with the first encapsulation layer 181. The first encapsulation layer 181 and the third encapsulation layer 183 may reduce or prevent external moisture or oxygen from penetrating into the light-emitting element OLED. The first encapsulation layer 181 and the third encapsulation layer 183 may be formed of an inorganic insulating material capable of low-temperature deposition, such as silicon nitride (SiNx), silicon oxide (SiOx), silicon oxynitride (SiON), or aluminum oxide ($Al_2O_3$). Since the first encapsulation layer 181 and the third encapsulation layer 183 are deposited in a low-temperature atmosphere, the light-emitting element OLED which is vulnerable to a high-temperature atmosphere can be prevented from being damaged during a deposition process for forming the first encapsulation layer 181 and the third encapsulation layer 183.

The second encapsulation layer 182 serves as a buffer to relieve stress between layers due to bending of the display apparatus and can flatten step differences between layers. The second encapsulation layer 182 may be formed on the substrate 101 on which the first encapsulation layer 181 is formed using a non-photosensitive organic insulating material such as an acrylic resin, an epoxy resin, a phenolic resin, a polyamide resin, a polyimide resin, or polyethylene or silicon oxycarbon (SiOC), or a photosensitive organic insulating material such as photoacrylic, but the embodiment is not limited thereto.

In a case where the second encapsulation layer 182 is formed through an inkjet method, a dam DAM may be disposed to prevent the second encapsulation layer 182 in a liquid form from diffusing to the edge of the substrate 101. The dam DAM may be positioned closer to the edge of the substrate 101 than the second encapsulation layer 182. The dam DAM may prevent the second encapsulation layer 182 from diffusing to a pad area where a conductive pad is positioned at the outermost edge of the substrate 101.

Although the dam DAM is designed to prevent diffusion of the second encapsulation layer 182, if the second encapsulation layer 182 is formed to exceed the height of the dam DAM during the process, the second encapsulation layer 182, which is an organic layer, may be exposed to the outside, and thus moisture and the like may penetrate into the light-emitting element OLED. Therefore, to prevent this, one or more dams DAM may be formed.

The dam DAM may be arranged on the protective film 145 in the non-display area NA. In addition, the dam DAM may be formed simultaneously with the first intermediate layer 150 and the second intermediate layer 160. A lower layer of the dam DAM may be formed when the first intermediate layer 150 is formed and an upper layer of the dam DAM may be formed when the second intermediate layer 160 is formed, and thus the dam DAM can be formed in a double laminated structure. Accordingly, the dam DAM may be formed of the same insulating material as the first intermediate layer 150 and the second intermediate layer 160, but the embodiment is not limited thereto.

The dam DAM may be formed to be superposed on a low-level driving power line EVSS. For example, the low-voltage driving power line EVSS may be formed in a layer under the area where the dam DAM is located in the non-display area NA.

The low-level driving power line EVSS and the gate driver 300 in a GIP structure are formed to surround the outer edge of the display panel 100, and the low-level driving power line (EVSS) may be located on the outer edge of the gate driver 300. Although the gate driver 300 is simply illustrated in the plan and cross-sectional views, it may be configured in the same structure as the driving transistor DT in the display area AA.

The low-level driving power line EVSS may be disposed on the outer edge of the gate driver 300, and may be arranged to surround the display area AA. The low-level driving power line EVSS may be made of the same material as the source and drain electrodes 140 of the thin film transistor TFT, but is not limited thereto. For example, the low-level driving power line EVSS may be made of the same material as the gate electrode 125. In addition, the low-level driving power line EVSS may be electrically connected to the anode 171. The low-level voltage EVSS may be supplied to the plurality of pixels of the display area AA through the low-level driving power line EVSS.

A touch layer 190 may be disposed on the encapsulation member 180. In the touch layer 190, a touch buffer film 191 may be positioned between a touch sensor metal including touch electrodes 195 and 196 and bridge electrodes **192*b* and 194*b* and the cathode 173** of the light-emitting element OLED.

The touch buffer film 191 may block the penetration of a chemical solution (developing solution, etching solution, or the like) used in the manufacturing process of the touch sensor metal disposed on the touch buffer film 191 or moisture from the outside into the emission layer 172 containing an organic substance. Accordingly, the touch buffer film 191 can prevent the emission layer 172 vulnerable to chemical solutions or moisture from being damaged.

The touch buffer film 191 may be formed at a low temperature equal to or lower than a predetermined temperature (e.g., 100° C.) in order to prevent damage to the emission layer 172 containing an organic substance vulnerable to high temperatures, and may be formed of an organic insulating material having a low dielectric constant of 1 to 3. For example, the touch buffer film 191 may be formed of an acrylic-series, epoxy-series, or siloxane-series material. The touch buffer film 191 having a flattening performance using an organic insulating material can prevent damage to the encapsulation member 180 due to bending of an organic light-emitting display apparatus and breakage of the touch sensor metal formed on the touch buffer film 191.

According to a mutual-capacitance-based touch sensor structure, the touch electrodes 195 and 196 are disposed on the touch buffer film 191, and the touch electrodes 195 and 196 may be arranged such that the first touch electrodes 195 and 196 disposed in a first direction intersect second touch electrodes (not shown).

The bridge electrodes **192*b* and 194*b* may include a first bridge electrode 192*b* that electrically connects the first touch electrodes 195 and 196 and a second bridge electrode 194*b* that electrically connects the second touch electrodes (not shown). The first bridge electrode 192*b*, the first and second touch electrodes 195 and 196, and the second bridge electrode 194*b* may be positioned at different levels with a touch insulating film 193 therebetween. The first and second touch electrodes 195 and 196 and the bridge electrodes 192*b* and 194*b* may be arranged to be superposed on the bank layer 165**, thereby preventing the aperture ratio from being reduced.

Meanwhile, a touch routing line 192 may be electrically connected to a touch pad 198 by passing through the upper and side surfaces of the encapsulation member 180 and the upper and side surfaces of the dam DAM. The touch pad 198 may be electrically connected to a touch driving circuit (not shown).

The touch routing line 192 may receive a touch driving signal from the touch driving circuit and transmit the touch driving signal to the touch electrodes 195 and 196 and may also transmit a touch sensing signal from the touch electrodes 195 and 196 to the touch driving circuit.

The touch routing line 192 may be formed of the same material as the first bridge electrode **192*b*. Although not shown in the figure, another touch routing line may be additionally disposed on the touch insulating film 193 on the upper and side surfaces of the encapsulation member 180 and the upper and side surfaces of the dam DAM to be superposed on the touch routing line 192. Another touch routing line may be formed of the same material as the touch electrodes 195 and 196. The other touch routing line may be electrically connected to the touch routing line 192 through a contact hole formed in the touch insulating film 193**.

Although FIG. 3 illustrates that the touch pad 198 is formed of the same material as the gate electrode 125, the present disclosure is not limited thereto. The touch pad 198 may be formed of the same material as the source and drain electrodes 140. In addition, the touch pad 198 may be formed with a structure in which the gate electrode 125 or the source and drain electrodes 140 and the touch electrodes 195 and 196 are laminated.

A touch protection film 197 may be disposed on the touch electrodes 195 and 196. In the figure, the touch protection film 197 is illustrated as being disposed only on the touch electrodes 195 and 196, but the embodiment is not limited thereto, and the touch protection film 197 may extend to the front or back of the dam DAM to be disposed on the touch routing line 192.

In addition, a color filter (not shown) may be further disposed on the encapsulation member 180, and the color filter may be positioned on the touch layer 190 or between the encapsulation member 180 and the touch layer 190.

FIG. 4 is a circuit diagram showing a pixel circuit in the display apparatus according to an embodiment of the present disclosure.

Referring to FIG. 4, the pixel P of the n-th row may include a driving transistor DT, a light-emitting element OLED connected to the driving transistor DT, and a control circuit for controlling the amount of driving current to be applied to the light-emitting element OLED through the driving transistor DT. For example, the control circuit may include first to fifth transistors T1 to T5 and a capacitor C1. A first electrode of the driving transistor DT is configured to receive the high-level driving voltage EVDD, and a second electrode thereof is connected to a third node N3. The gate electrode of the driving transistor DT is connected to a second node N2. The driving transistor DT may be turned on according to the voltage applied to the second node N2 to control the amount of driving current flowing to the light-emitting element OLED.

A first electrode of the first transistor T1 is connected to a data line DL through which a data voltage Vdata is supplied, and a second electrode thereof is connected to a first node N1. The gate electrode of the first transistor T1 may be connected to a scan line SCL of the n-th pixel row to receive a second scan signal SC2. The first transistor T1 may be turned on according to the second scan signal SC2 to transmit the data voltage Vdata applied through the data line DL to the first node N1. The first transistor T1 may be a first switching transistor.

The capacitor C1 is connected between the first node N1 and the second node N2. The capacitor C1 can store a voltage corresponding to a voltage difference between the first node N1 and the second node N2. For example, the capacitor C1 can store a voltage corresponding to a difference between the data voltage Vdata applied to the data line DL and the voltage of the second node N2 and can maintain the stored voltage for one frame period to stabilize the voltage of the gate electrode (i.e., the second node N2) of the driving transistor DT. The capacitor C1 may be a storage capacitor Cst.

The second transistor T2 is connected between the second node N2 and the third node N3. The gate electrode of the second transistor T2 may receive a first scan signal SC1. The second transistor T2 may be turned on according to the first scan signal SC1 to electrically connect the gate electrode (second node N2) and the second electrode (third node N3) of the driving transistor DT. In this manner, the second transistor T2 may be configured in a diode connection structure in which the second node N2 and the third node N3 are connected.

In another embodiment, the second transistor T2 may be composed of a plurality of sub-transistors connected in series to curb leakage current when turned off. In such a dual-gate structure, two gate electrodes are connected to each other to have the same potential, and the channel length is longer than that in a single-gate structure. As the channel length increases, the resistance increases and the leakage current is reduced when turned off, and thus operation stability can be secured. The second transistor T2 may be a second switching transistor.

A first electrode of the third transistor T3 is configured to receive a reference voltage Vref, and the second electrode thereof is connected to the first node N1. The gate electrode of the third transistor T3 may be connected to an emission line through which the emission control signal EM is supplied to receive the emission control signal EM. The third transistor T3 may be turned on according to the emission control signal EM to transmit the reference voltage Vref to the first node N1. The third transistor T3 may be a third switching transistor.

The fourth transistor T4 is connected between the third node N3 and a fourth node N4. The gate electrode of the fourth transistor T4 may be connected to the emission line to receive the emission control signal EM. The fourth transistor T4 may be turned on according to the emission control signal EM to electrically connect the driving transistor DT (third node N3) and the light-emitting element OLED (fourth node N4). The fourth transistor T4 may be a light-emitting transistor.

A first electrode of the fifth transistor T5 is configured to receive the reference voltage Vref, and a second electrode thereof is connected to the fourth node N4. The gate electrode of the fifth transistor T5 may be connected to the scan line to receive the first scan signal SC1. The fifth transistor T5 may be turned on according to the first scan signal SC1 to apply the reference voltage Vref to the anode (fourth node N4) of the light-emitting element OLED. The fifth transistor T5 may be an initialization transistor.

The anode ANO of the light-emitting element OLED may be connected to the fourth node N4, and the cathode CAT thereof may receive the low-level driving voltage EVSS. When the driving transistor DT and the fourth transistor T4 are turned on, a current path is formed between the high-level driving voltage EVDD and the low-level driving voltage EVSS, and thus a driving current may flow to the light-emitting element OLED. The light-emitting element OLED may emit light with a brightness corresponding to the amount of driving current applied thereto.

In the embodiment illustrated in FIG. 4, the pixel P includes a low temperature polysilicon (LTPS) thin film transistor.

The LTPS thin film transistor includes a gate electrode, a source electrode, and a drain electrode. The LTPS thin film transistor has an active layer formed of polysilicon. Such an LTPS thin film transistor may be configured as a P-type thin film transistor. The LTPS thin film transistor has high electron mobility, and thus has fast driving characteristics.

However, the present embodiment is not limited thereto. In another embodiment, at least one of the transistors DT and T1 to T5 may be configured as an oxide semiconductor thin film transistor.

An oxide semiconductor thin film transistor includes a gate electrode, a source electrode, and a drain electrode. The oxide semiconductor thin film transistor has an active layer formed of an oxide semiconductor. Here, the oxide semiconductor can be an amorphous or crystalline oxide semiconductor. The oxide semiconductor thin film transistor may be configured as an N-type transistor. The oxide semiconductor thin film transistor may be processed at a low temperature and has lower charge mobility than LTPS thin film transistors. Such an oxide semiconductor thin film transistor has excellent off-current characteristics.

Figure 5:
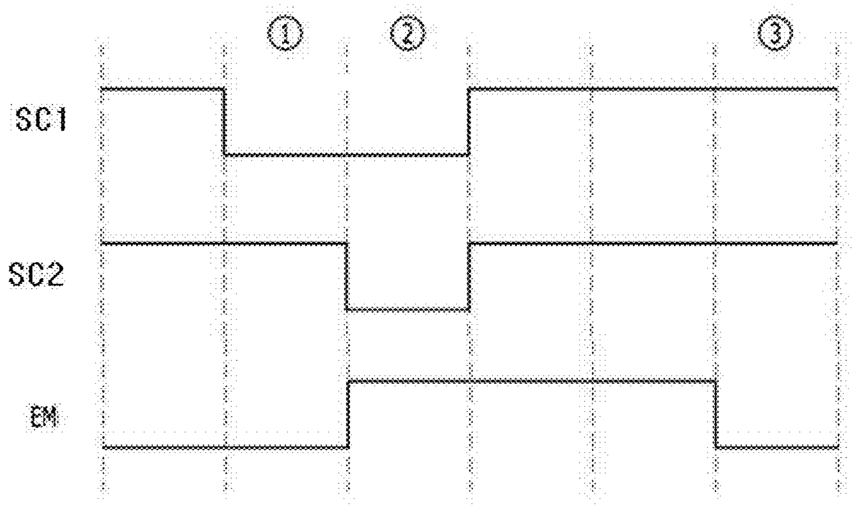
FIG. 5 is a diagram showing operation waveforms of the pixel circuit shown in FIG. 4 according to an embodiment of the present disclosure.

FIG. 5 is a diagram showing operation waveforms of the pixel circuit illustrated in FIG. 4 according to an embodiment of the present disclosure. Referring to FIG. 5, each of the plurality of pixels P may perform an initialization operation ①, a programming operation ②, and a light-emitting operation ③ according to the scan signals SC1 and SC2 and the emission control signal EM.

During the initialization period ① in which the initialization operation is performed, the pixel circuit can initialize specific nodes within the pixel circuit to the reference voltage Vref for operation stability.

During the programming period ② in which the programming operation is performed, the pixel circuit can program the gate-source voltage of the driving transistor DT on the basis of the data voltage Vdata. During the programming period ②, the threshold voltage of the driving transistor DT can be sampled and compensated.

During the light-emitting period ③ in which the light-emitting operation is performed, the driving current corresponding to the gate-source voltage flows between the source and drain of the driving transistor DT, and the light-emitting element EL emits light according to the driving current. The light-emitting transistor T4 can be turned on during the initialization period ① and the light-emitting period ③ according to the emission control signal EM(n) and turned off during the programming period ②.

First, referring to FIG. 5, one frame may include an initialization period ①, a programming period ②, and a light-emitting period ③.

During the initialization period ①, the emission control signal EM at a turn-on level is applied to turn on the third transistor T3, and the first scan signal SC1 at a turn-on level is applied to turn on the second and fifth transistors T2 and T5. Accordingly, the reference voltage Vref is applied to the first node N1 and the fourth node N4 during the initialization period ①. At this time, the second node N2 to which the gate electrode of the driving transistor DT is connected and the third node N3 to which the second electrode of the driving transistor DT is connected are initialized to be equipotential by the second transistor T2.

During the programming period ②, the first scan signal SC1 maintains the turn-on level, the emission control signal EM switches to a turn-off level, and the second scan signal SC2 switches to the turn-on level. Accordingly, the third transistor T3 and the fourth transistor T4 are turned off, and the first transistor T1, the second transistor T2, and the fifth transistor T5 are turned on.

Accordingly, during the programming period ②, the data voltage Vdata applied to the data line DL is applied to the first node N1, and the voltage corresponding to the difference between the data voltage Vdata and the reference voltage Vref can be gradually reached in response to the charging voltage of the capacitor C1.

When the charging voltage of the capacitor C1 is transferred to the gate electrode of the driving transistor DT, the source-gate voltage of the driving transistor DT exceeds the threshold voltage Vth and thus the driving transistor DT can be turned on. At this time, the source-drain current of the driving transistor DT can be determined according to the data voltage Vdata, the reference voltage Vref, and the threshold voltage of the driving transistor DT.

The driving transistor DT may supply the source-drain current to the third node N3 until the source-gate voltage reaches the threshold voltage of the driving transistor DT. The second transistor T2 may supply the voltage of the third node N3 to the second node N2.

In this manner, while the driving transistor DT is turned on, the voltage of the second node N2 and the source-drain current of the driving transistor DT can be changed, and the voltage of the second node N2 can eventually converge on the difference voltage between the data voltage Vdata and the threshold voltage Vth of the driving transistor DT.

During the programming period ②, the reference voltage Vref is applied to the fourth node N4 through the fifth transistor T5, and thus the anode of the light-emitting element EL can be initialized to the reference voltage Vref in response to the voltage of the fourth node N4.

A hold period may be additionally included between the programming period ② and the light-emitting period ③. During the hold period, the second scan signal SC2 and the first scan signal SC1 switch to a turn-off level, and thus the first transistor T1, the second transistor T2, and the fifth transistor T5 are turned off. During the hold period, the voltage of the second node N2 can be stably maintained through the capacitor C1.

During the light-emitting period ③, the emission control signal EM at the turn-on level is applied to turn on the third transistor T3 and the fourth transistor T4, and a current path from the high-level driving voltage EVDD to the light-emitting element EL via the driving transistor DT is formed.

During the light-emitting period ③, the reference voltage Vref is applied to the first node N1 through the turned-on third transistor T3. At this time, since both ends of the capacitor C1 are coupled, the voltage of the second node N2 can become [Vref-Data+VDD+Vth].

Accordingly, the driving transistor DT can cause the driving current corresponding to the programmed voltage to flow through the current path such that the light-emitting element EL emits light with a brightness corresponding to the driving current.

Figure 6:
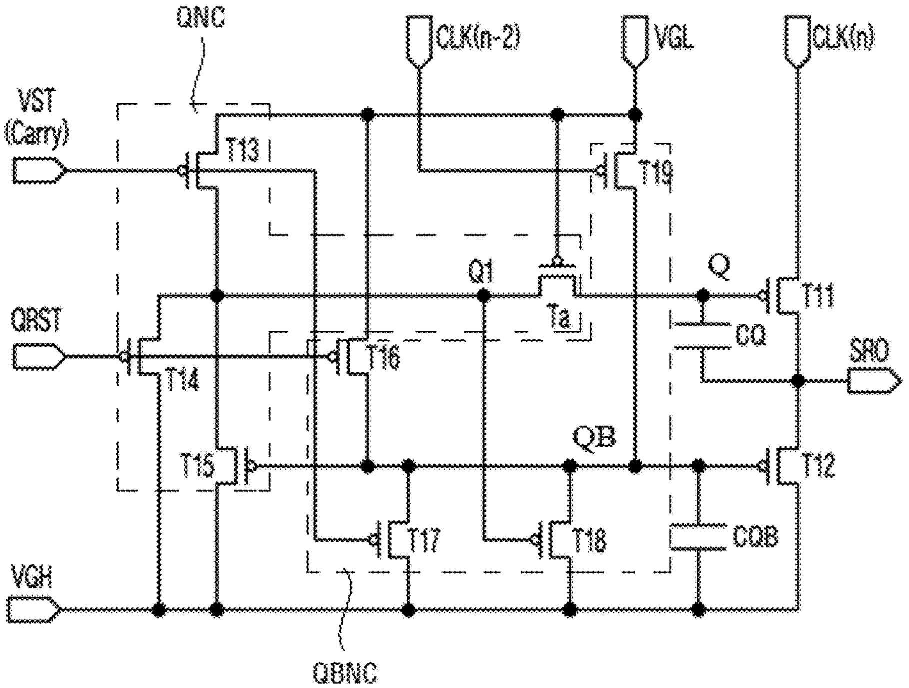
FIG. 6 is a circuit diagram showing a scan signal generator of the gate driver of the display apparatus according to an embodiment of the present disclosure.

FIG. 6 is a circuit diagram showing a scan signal generator of the gate driver in the display apparatus according to an embodiment of the present disclosure. FIG. 6 illustrates one of stages STG1 to STGn of a shift register.

Referring to FIG. 6, the scan signal generator of the gate driver 300 may include a first output transistor T11, a second output transistor T12, a transfer transistor Ta, a first transistor T13, a second transistor T14, a third transistor T15, a fourth transistor T16, a fifth transistor T17, a sixth transistor T18, a seventh transistor T19, a first capacitor CQ, and a second capacitor CQB.

The first output transistor T11 may output one clock signal CLK(n) among a plurality of clock signals CLK1 to CLK5 to an output terminal SRO in response to a signal of a Q node Q. The second output transistor T12 may output a gate high voltage (VGH) to the output terminal SRO in response to a signal of a QB node QB.

The transfer transistor Ta may transfer the voltage of a Q1 node Q1 to the Q node Q in response to a gate low voltage VGL.

The first transistor T13 may provide the gate low voltage VGL to the Q1 node Q1 in response to a start signal VST or an output signal Carry of a previous stage.

The second transistor T14 may provide the gate high voltage VGH to the Q1 node Q1 in response to a reset signal QRST.

The third transistor T15 may provide the gate high voltage VGH to the Q1 node Q1 in response to the signal of the QB node QB.

The fourth transistor T16 may provide the gate low voltage VGL to the QB node QB in response to the reset signal QRST.

The fifth transistor T17 may provide the gate high voltage VGH to the QB node QB in response to the start signal VST or the output signal Carry of the previous stage.

The sixth transistor T18 may provide the gate high voltage VGH to the QB node QB in response to the voltage of the Q1 node Q1.

The seventh transistor T19 may provide the gate low voltage VGL to the QB node QB in response to one clock signal CLK(n−1) among the plurality of clock signals CLK1-CLK5.

The first capacitor CQ may be coupled between the Q node Q and the output terminal SRO.

The second capacitor CQB may be coupled between the QB node QB and a gate high voltage line through which the gate high voltage VGH is supplied.

The first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be formed of different types of transistors, but the embodiments of the present disclosure are not limited thereto.

For example, one of the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be an oxide transistor having an oxide semiconductor as a semiconductor layer, but the embodiments of the present disclosure are not limited thereto. Oxide semiconductor materials have a low off-current and thus may be suitable for switching transistors having a short turn-on time and a long turn-off time, but the embodiments of the present disclosure are not limited thereto.

As another example, another one of the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be a transistor using low temperature polysilicon (LTPS) as a semiconductor layer, but the embodiments of the present disclosure are not limited thereto. For example, one of the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be formed using one or a combination of an oxide semiconductor layer, a polysilicon semiconductor layer, and an LTPS layer, but the embodiments of the present disclosure are not limited thereto.

The first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be N-type transistors or P-type transistors.

In N-type transistors, electrons serve as carriers, and thus electrons can flow from the source electrode to the drain electrode and current can flow from the drain electrode to the source electrode. In P-type transistors, holes serve as carriers, and thus holes can flow from the source electrode to the drain electrode and current can flow from the source electrode to the drain electrode.

For example, one of the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be an N-type transistor. Another one of the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 may be a P-type transistor.

Although the first output transistor T11, the second output transistor T12, the transfer transistor Ta, the first transistor T13, the second transistor T14, the third transistor T15, the fourth transistor T16, the fifth transistor T17, the sixth transistor T18, and the seventh transistor T19 are all P-type transistors in FIG. 6, the embodiments of the present disclosure are not limited thereto.

In FIG. 6, the transfer transistor Ta, the first transistor T13, the second transistor T14, and the third transistor T15 may be a Q node controller QNC that controls the voltage of the Q node. The fourth transistor T16 to the seventh transistor T19 may be a QB node controller QBNC that controls the voltage of the QB node.

As shown in FIG. 6, a structure for applying a reset signal QRST may be used to improve the multi-output phenomenon through power-on stabilization and low level reinforcement of the QB node. The reset signal QRST may be applied in a blank period such that the gate driver (GIP) can perform normal output before the start of a frame. That is, a function of resetting all gate lines of the display panel is performed by applying the reset signal QRST to all gate lines of the display panel.

The circuit of the scan signal generator illustrated in FIG. 6 may be applied to both the first scan driver 321 and the second scan driver 322 described with reference to FIG. 2. In addition, the capacitance of the first capacitor CQ and the capacitance of the second capacitor CQB may be greater than the capacitance of the capacitor C1 described with reference to FIG. 4.

The operation of the scan driver of the display apparatus according to one embodiment of the present disclosure will be described below.

Figure 7:
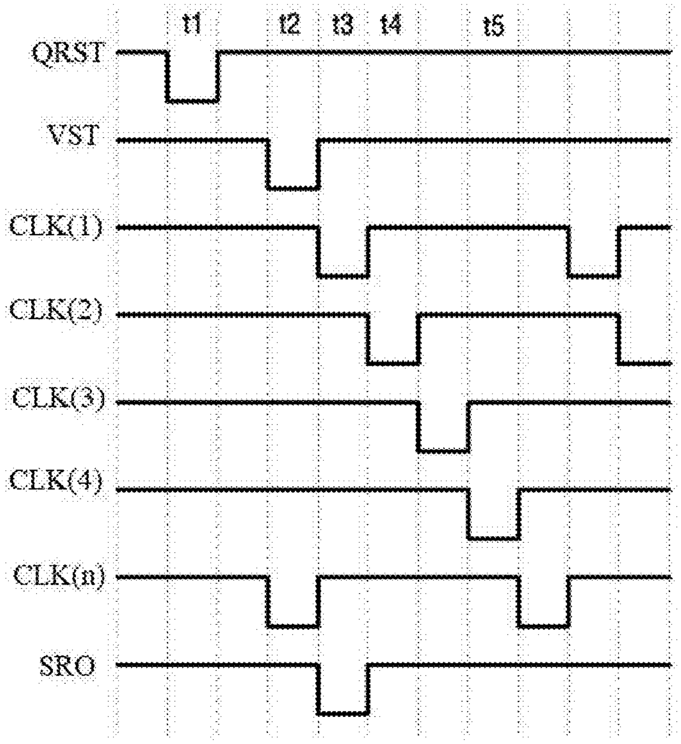
FIG. 7 is a waveform diagram of the scan signal generator in the gate driver of the display apparatus according to an embodiment of the present disclosure.

FIG. 7 is a waveform diagram of the scan signal generator in the gate driver of the display apparatus according to an embodiment of the present disclosure.

FIG. 7 illustrates that n-phase clock signals CLK(1) to CLK(n) are provided, the first clock signal CLK(1) is applied to the first output transistor T11 of FIG. 6, and the fourth clock signal CLK(4) is applied to the seventh transistor T19 of FIG. 6.

First, the transfer transistor Ta is controlled by the gate low voltage VGL, and thus can always be maintained in a turn-on state.

As illustrated in FIG. 7, during a first period t1 in which the start signal VST or the output signal Carry of the previous stage is at a high level, the first clock signal CLK(1) to the n-th clock signal CLK(n) are at a high level, and only the reset signal QRST is at a low level, only the second transistor T14 to the fourth transistor T16 are turned on, and the remaining transistors T13, T17, T18, and T19 are turned off, and thus the gate high voltage VGH can be supplied to the Q node Q and the gate low voltage VGL can be supplied to the QB node QB.

Accordingly, the first output transistor T11 is turned off and the second output transistor T12 is turned on, and thus the output terminal SRO can output the gate high voltage VGH.

During a second period t2 in which transition of the start signal VST or the output signal Carry of the previous stage to a low level occurs, transition of the n-th clock signal CLK(n) to a low level occurs, transition of the reset signal QRST to a high level occurs, and the first clock signal CLK(1) to the fourth clock signal CLK(4) are at a high level, the first transistor T13 and the third transistor T15 are turned on, and thus the gate low voltage VGL can be supplied to the Q node Q and the gate high voltage VGH can be supplied to the QB node QB.

Accordingly, the first output transistor T11 is turned on and the second output transistor T12 is turned off, and thus the output terminal SRO outputs the first clock signal CLK(1) at the high-level voltage.

During a third period t3 in which transition of the start signal VST or the output signal Carry of the previous stage to a high level occurs, transition of the n-th clock signal CLK(n) to a high level occurs, transition of the first clock signal CLK(1) to a low level occurs, and the second clock signal CLK(2) to the fourth clock signal CLK(4) and the reset signal QRST maintain a high level, the first transistor T13 and the third transistor T15 are turned off, and thus the Q node Q maintains the gate low voltage VGL and the QB node QB maintains the gate high voltage VGH. Accordingly, the first output transistor T11 is turned on and the second output transistor T12 is turned off. At this time, since the first clock signal CLK(1) is input at a low level, the output terminal SRO outputs the first clock signal CLK(1) at the low-level voltage.

During a fourth period t4 in which the start signal VST or the output signal Carry of the previous stage maintains a high level, transition of the first clock signal CLK(1) to a high level occurs, transition of the second clock signal CLK(2) to a low level occurs, and the third clock signal CLK(3) to the n-th clock signal CLK(n) and the reset signal QRST maintain high levels, the Q node Q maintains the gate low voltage VGL and the QB node QB maintains the gate high voltage VGH. Accordingly, the first output transistor T11 is turned on and the second output transistor T12 is turned off. At this time, since the first clock signal CLK(1) is input at a high level, the output terminal SRO outputs the first clock signal CLK(1) at the high-level voltage.

During a fifth period t5 in which the start signal VST or the output signal Carry of the previous stage maintains a high level, transition of the third clock signal CLK(3) to a high level occurs, transition of the fourth clock signal CLK(4) to a low level occurs, and the first clock signal CLK(1), the second clock signal CLK(2), the n-th clock signal CLK(n), and the reset signal QRST maintain high levels, the seventh transistor T19 is turned on such that the gate low voltage VGL can be supplied to the QB node QB, and the third transistor T15 is turned on such that the gate high voltage VGH can be supplied to the Q node Q. Accordingly, the first output transistor T11 is turned off and the second output transistor T12 is turned on, and thus the output terminal SRO outputs the gate high voltage VGH.

In the display apparatus operating in this manner, the present disclosure divides the display area into up, down, left, and right regions and enables driving of the respective regions with separate frequencies.

First, an embodiment in which the display area is divided into left and right regions and the respective regions are driven with separate frequencies will be described below.

Figure 8:
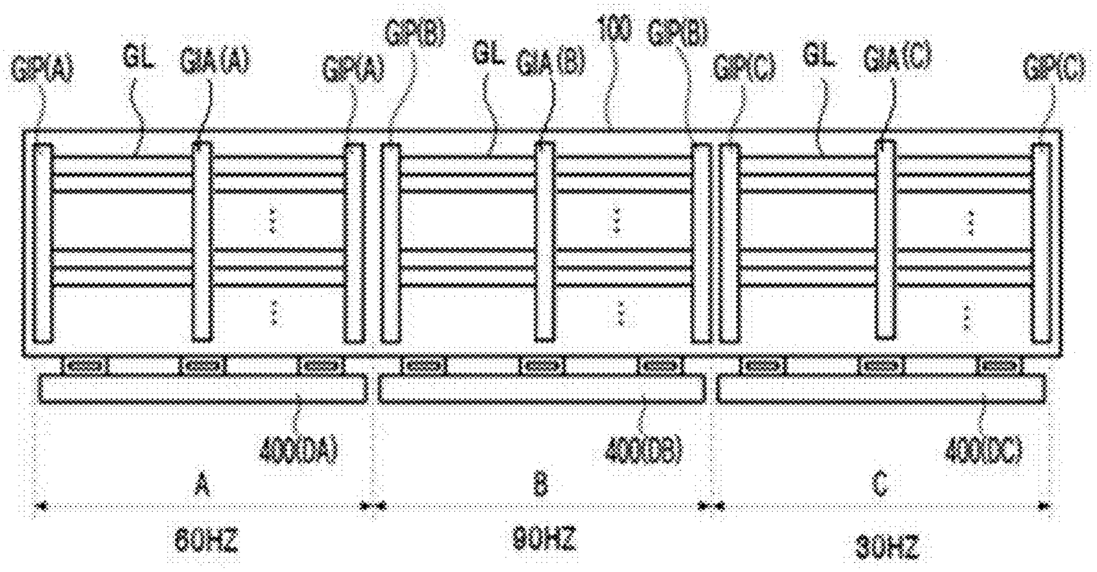
FIG. 8 is a diagram illustrating driving of left and right regions of the display apparatus with separate frequencies according to an embodiment of the present disclosure.
Figure 9:
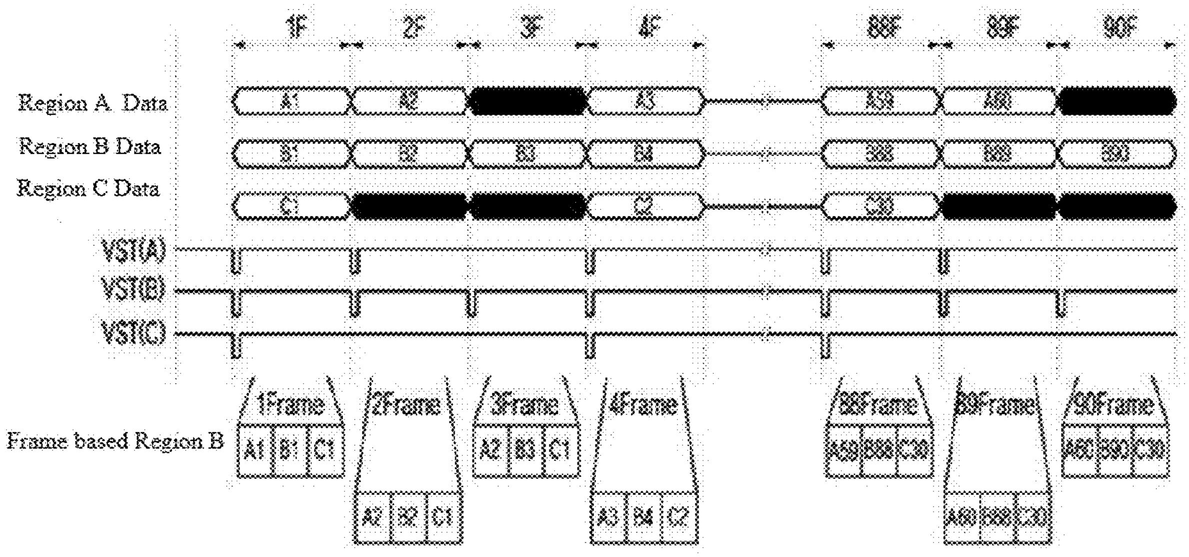
FIG. 9 is a timing diagram illustrating driving of left and right regions of the display apparatus with separate frequencies according to an embodiment of the present disclosure.

FIG. 8 is a diagram illustrating driving of left and right regions of the display apparatus with separate frequencies according to an embodiment of the present disclosure. FIG. 9 is a timing diagram illustrating driving of left and right regions of the display apparatus with separate frequencies according to an embodiment of the present disclosure.

Recently, liquid crystal display devices or organic light emitting display devices are used as display devices for dashboards of automobiles. The dashboard of an automobile may be divided into a first region that displays speed, driving distance, RPM, etc., a second region that displays navigation, and a third region that displays weather, time, news, etc., and a driving frequency appropriate for the function of each region is provided.

Accordingly, the display panel may be divided into a first region A for displaying speed, driving distance, RPM, etc., a second region B for displaying navigation, and a third region C for displaying weather, time, news, etc., in the horizontal direction and the first region A, the second region B, and the third region C may be defined by cutting gate lines GL for each region.

In addition, the gate drivers GIP(A), GIA(A), GIP(B), GIA(B), GIP(C), and GIA(C) may be independently disposed in the respective regions A, B, and C. At least one gate driver GIP may be disposed for each region A, B and C.

For example, in the first region A, two gate drivers GIP(A) may be disposed in non-display areas on both sides, and at least one gate driver GIA(A) may be disposed within the display area.

In the second area B, two gate drivers GIP(B) may be disposed in non-display areas on both sides, and at least one gate driver GIA(B) may be disposed within the display area.

In the third region C, two gate driver GIP(C) may be disposed in non-display areas on both sides, and at least one gate driver GIA(C) may be disposed within the display area.

The configuration of each gate driver GIP(A), GIA(A), GIP(B), GIA(B), GIP(C), and GIA(C) disposed in each region A, B, and C may have the same configuration as described with reference to FIG. 6.

In addition, the data driver 400 may commonly apply a data voltage to the data lines DL of the regions A, B, and C. However, the present disclosure is not limited thereto. The data driver 400 may be divided into data drivers 400(DA), 400(DB), and 400(DC) and separately disposed in the respective regions A, B, and C for the data lines DL of the regions A, B, and C, and the data drivers 400(DA), 400(DB), and 400(DC) may apply data voltages to the data lines of the respective regions A, B, and C.

FIG. 8 illustrates an example in which the first region A is driven at 60 Hz, the second region B is driven at 90 Hz, and the third region C is driven at 30 Hz.

A method of skipping frames may be applied to driving of the regions A, B, and C in the horizontal direction with separate frequencies.

For example, as shown in FIG. 8 and FIG. 9, in the second region B driven at 90 Hz, there is no skipped frame. That is, the data driver 400(DB) supplies a data voltage B1 to B90 of 90 frames per second to the data lines of the second region B under the control of the controller 200. In addition, the controller 200 provides the start signal VST having a low level to the gate driver GIP(B) for driving the second region B at the start of each frame (the second period t2 described in FIG. 7). Accordingly, the gate driver GIP(B) for driving the second region B sequentially outputs a scan signal to the gate lines of the second region B according to the start signal VST, as described in FIG. 7. Therefore, the second region B can be driven at 90 Hz to display an image.

As shown in FIG. 8 and FIG. 9, in the first region A driven at 60 Hz, 3k-th (k being a natural number) frames are skipped. That is, the data driver 400(DA) supplies a data voltage A1 to A60 of 60 frames per second to the data lines of the first region A under the control of the controller 200. That is, the data voltage Vdata is not output in the 3k-th frames, or the data voltage of the previous frame is held according to the frame skipping method.

In addition, in the (3k-2)-th and (3k-1)-th frames, the controller 200 provides the start signal VST having a low level to the gate driver GIP(A) for driving the first region A at the start of the frames (the second period t2 described in FIG. 7), and in the (3k)-th frames, the controller 200 does not provide the start signal VST having a low level to the gate driver GIP(A) for driving the first region A at the start of the frames (the second period t2 described in FIG. 7) and provides the start signal VST having a high level to the gate driver GIP(A) for driving the first region A at the start of the frames (the second period t2 described in FIG. 7). Therefore, the (3k)-th frames are skipped, and the first region A can be driven at 60 Hz to display an image.

As illustrated in FIG. 8 and FIG. 9, in the third region C driven at 30 Hz, (3k-1)-th and (3k)-th frames are skipped. That is, the data driver 400(DC) supplies a data voltage C1 to C30 of 30 frames per second to the data lines of the third region C under the control of the controller 200. That is, the data voltage Vdata is not output in the (3k-1)-th and (3k)-th frames, or the data voltage of the previous frame is held according to the frame skipping manner.

In the (3k-2)-th frames, the controller 200 provides the start signal VST having a low level to the gate driver GIP(C) for driving the third region C at the start of the frames (the second period t2 described in FIG. 7), and in the (3k-1)-th and 3k-th frames, the controller 200 does not provide the start signal VST having a low level to the gate driver GIP(C) for driving the third region C at the start of the frames (the second period t2 described in FIG. 7) and provides the start signal VST having a high level to the gate driver GIP(C) for driving the third region C at the start of the frames (the second period t2 described in FIG. 7). Therefore, the (3k-1)-th and 3k-th frames are skipped, and the third region C can be driven at 30 Hz to display an image.

Figure 10:
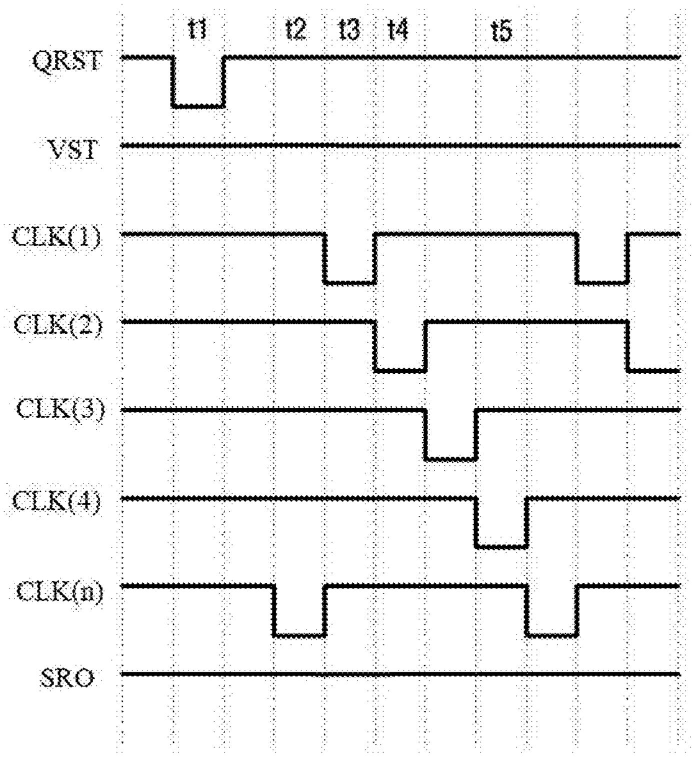
FIG. 10 is a waveform diagram of the scan signal generator for frame skipping in the gate driver of the display apparatus according to an embodiment of the present disclosure.
Figure 11A:
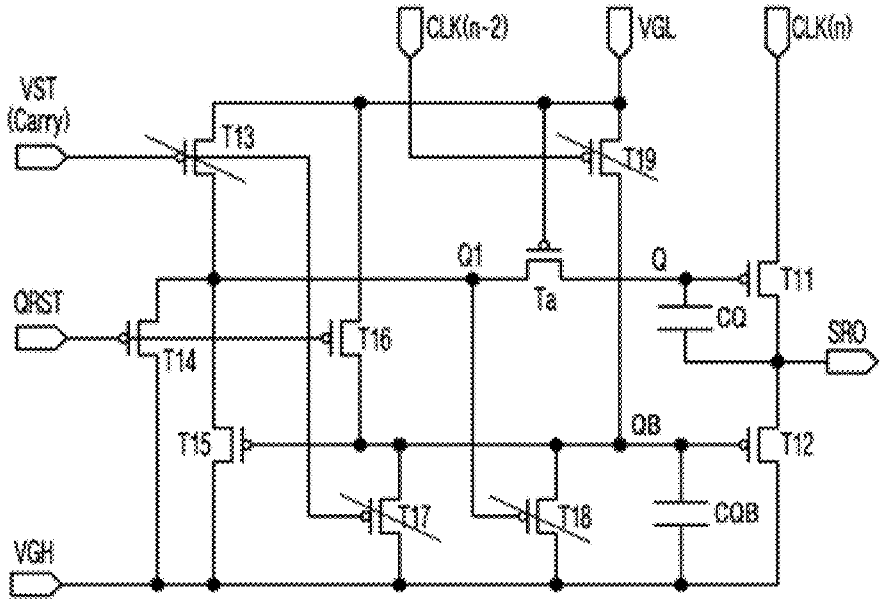
FIG. 11A to FIG. 11E are circuit diagrams showing on/off states of transistors of the scan signal generator in the respective periods in FIG. 10.
Figure 11B:
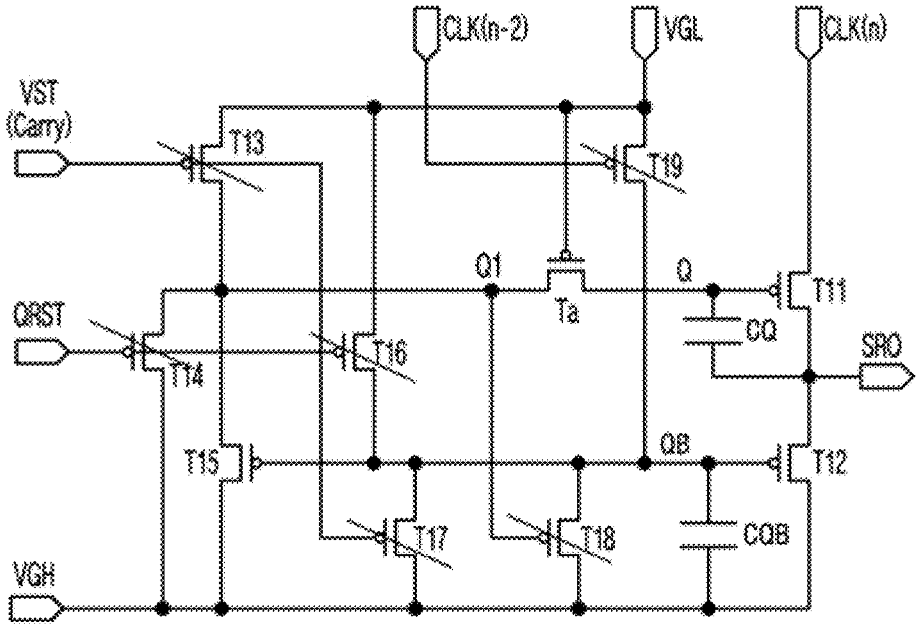
Figure 11C:
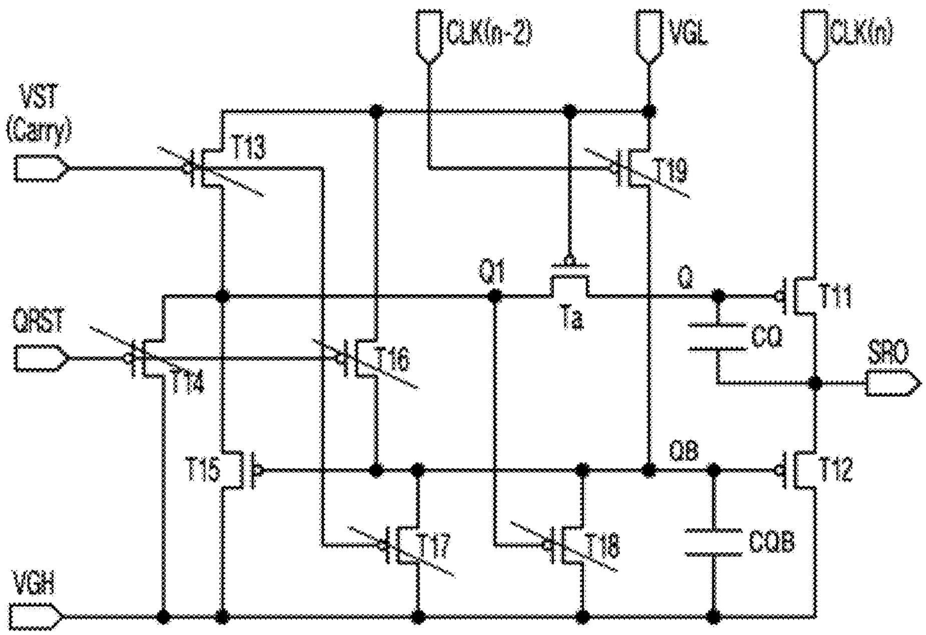
Figure 11D:
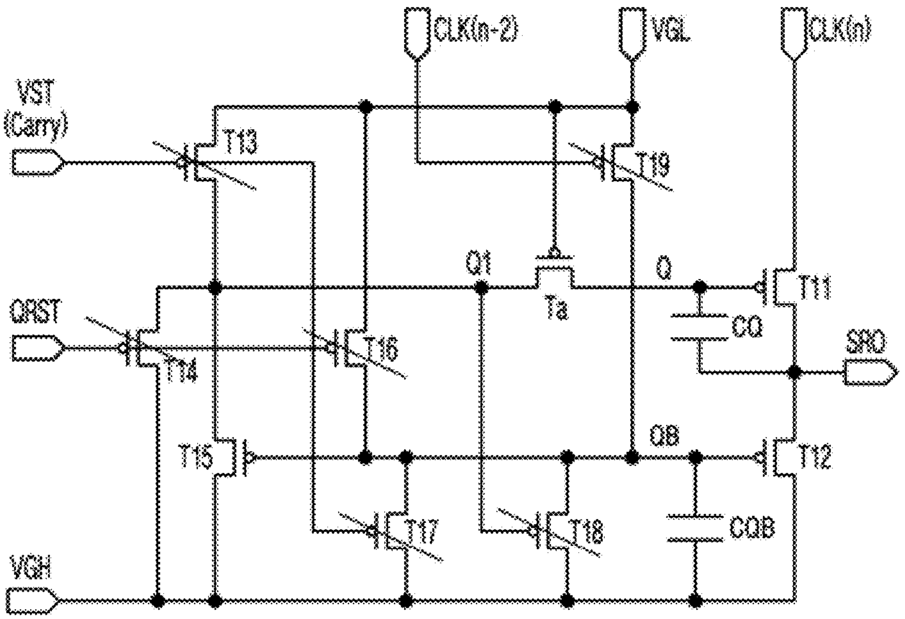
Figure 11E:
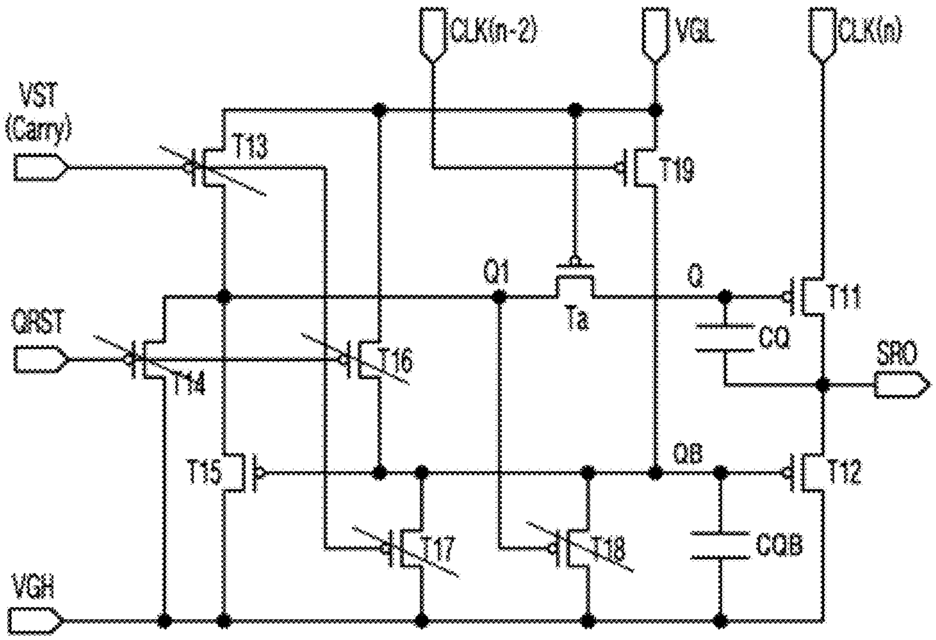

FIG. 10 is a waveform diagram of a scan signal generator for frame skipping in the gate driver of the display apparatus according to an embodiment of the present disclosure.

FIG. 11A to FIG. 11E are circuit diagrams showing on/off states of the transistors of the scan signal generator in each period in FIG. 10.

As shown in FIG. 10 and FIG. 11A to FIG. 11E, when the start signal VST having a high level is supplied to the gate driver GIP(A) of the first region A driven at 60 Hz and the gate driver GIP(C) of the third region C driven at 30 Hz at the start of a skipped frame (the second period t2 described in FIG. 7), the output terminals SRO of the gate drivers GIP(A) and GIA(A) and the gate drivers GIP(C) and GIA (C) do not output a scan signal.

As described above, the scan signal generators of the gate drivers GIP(A) and GIA(A) of the first region A, the gate drivers GIP(B) and GIA(B) of the second region B, and the gate drivers GIP(C) and GIA(C) of the third region C have the same circuit configuration.

In addition, the low-level voltage of the start signal VST may be modulated into a high-level voltage, and the modulated start signal VST may be supplied to the gate drivers GIP(A) and GIA(A) of the first region A and the gate drivers GIP(C) and GIA(C) of the third region C to drive the respective regions at separate frequencies.

Furthermore, the display apparatus of the present disclosure can drive respective regions divided in the vertical direction at separate frequencies, as well as driving respective regions divided in the horizontal direction at separate frequencies.

Figure 12:
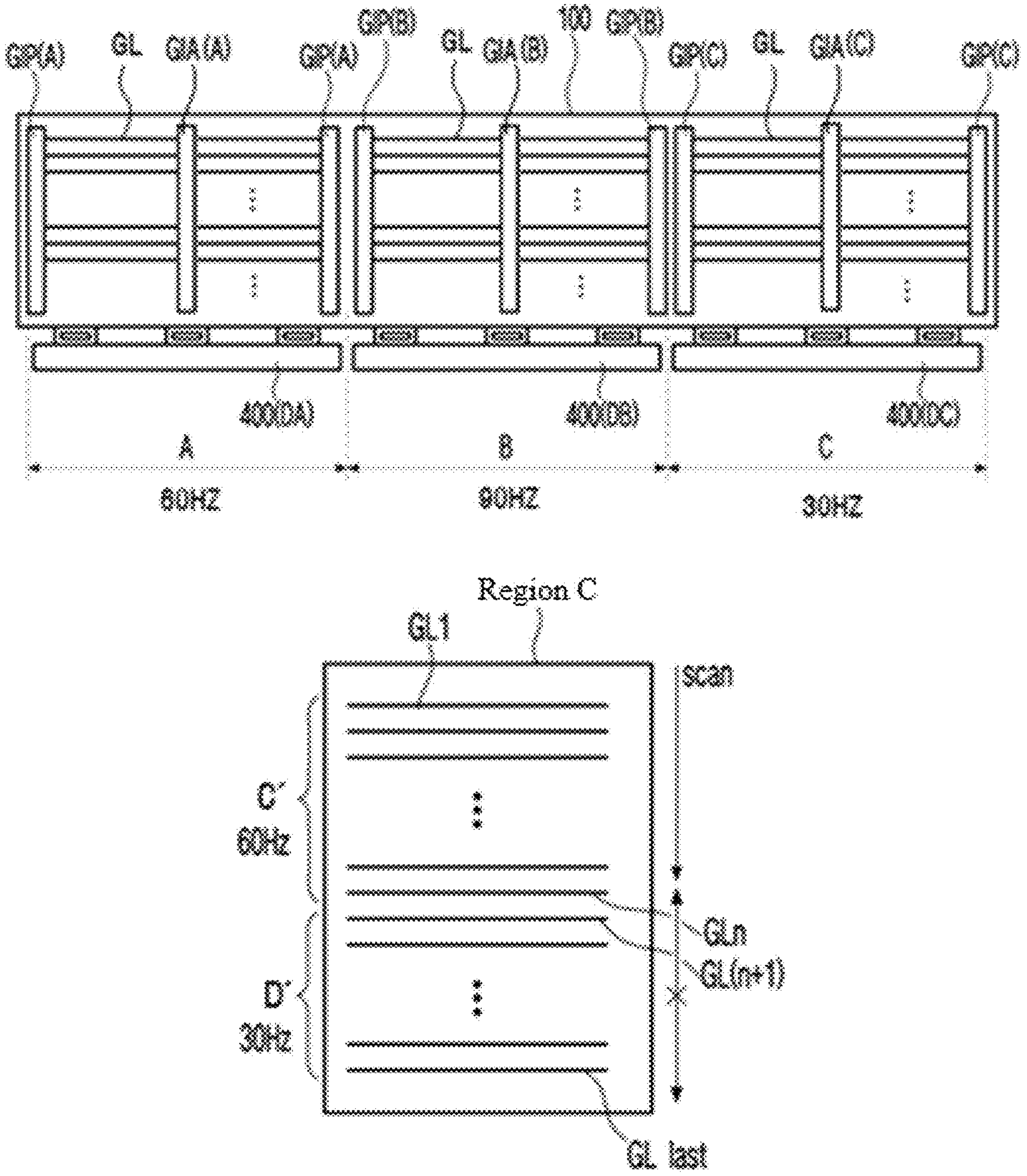
FIG. 12 is a diagram illustrating driving of upper and lower regions of the display apparatus with separate frequencies according to another embodiment of the present disclosure.
Figure 13A:
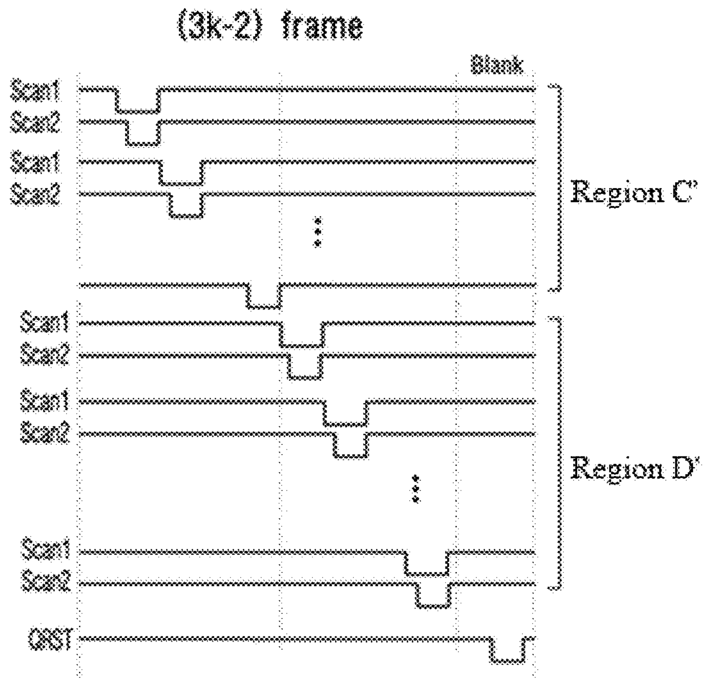
FIG. 13A to FIG. 13C are waveform diagrams of scan signals for (3k-2)-th, (3k-1)-th, and (3k)-th frames and a reset signal QRST for describing driving of upper and lower regions of the display apparatus with separate frequencies according to another embodiment of the present disclosure.
Figure 13B:
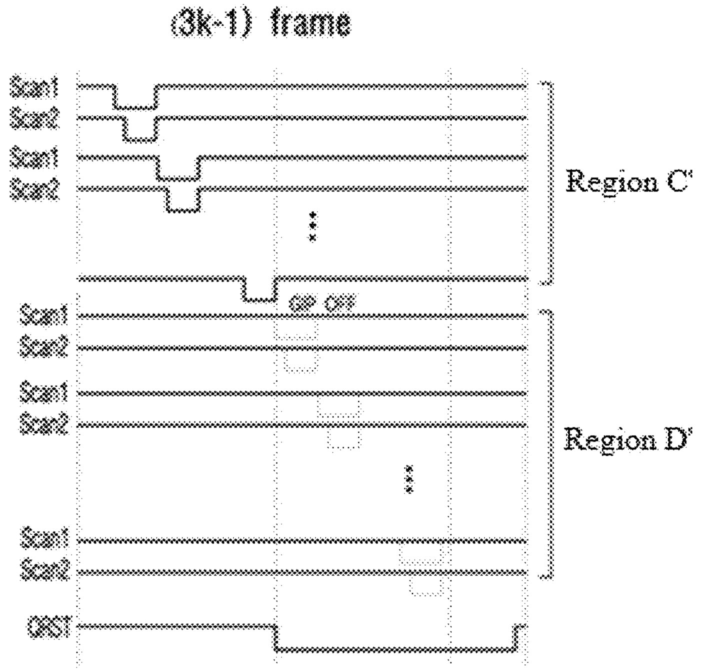
Figure 13C:
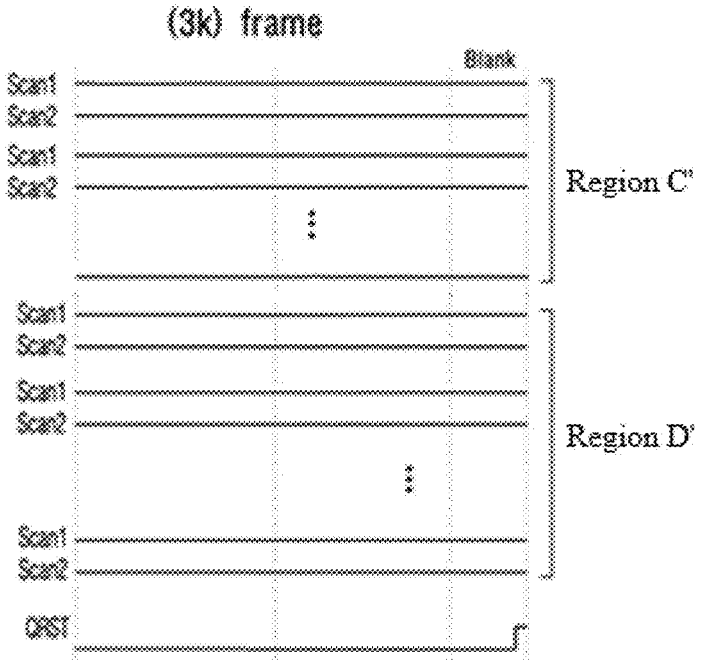
Figure 14:
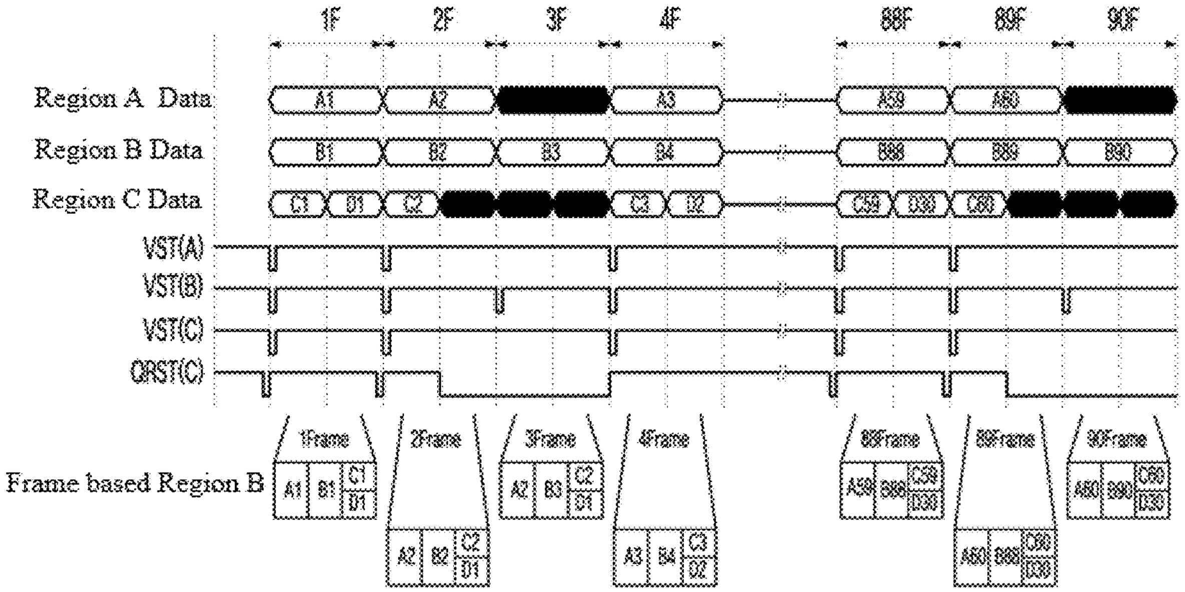
FIG. 14 is a timing diagram of driving of upper and lower regions of the display apparatus with separate frequencies according to another embodiment of the present disclosure.

FIG. 12 is a diagram showing an example of driving of upper and lower divided regions of the display apparatus using separate frequencies according to another embodiment of the present disclosure. FIG. 13A to FIG. 13C are waveform diagrams of scan signals for (3k-2)-th, (3k-1)-th and 3k-th frames and a reset signal QRST for describing driving of upper and lower divided regions of the display apparatus using separate frequencies according to another embodiment of the present disclosure. FIG. 14 is a timing diagram of driving of upper and lower divided regions of the display apparatus using separate frequencies according to another embodiment of the present disclosure.

In FIG. 12, as described with reference to FIG. 8 and FIG. 9, the display panel may be divided into a first region A for displaying driving speed, driving distance, RPM, etc., a second region B for displaying navigation, and a third region C for displaying weather, time, news, etc., in the horizontal direction, and the first region A, the second region B, and the third region C may be defined by cutting the gate lines GL. In addition, the third region C may be divided in the vertical direction into a (3-1)-th region C' and a (3-2)-th region D'.

Gate drivers GIP(A), GIA(A), GIP(A), GIP(B), GIA(B), GIP(B), GIP(C), GIA(C), and GIP(C) may be independently disposed in the respective regions A, B, and C. At least one gate driver GIP may be disposed for each of the regions A, B, and C.

For example, in the first region A, two gate drivers GIP(A) may be disposed in non-display areas on both sides, and at least one gate driver GIA(A) may be disposed in the display area.

In the second region B, two gate drivers GIP(B) may be disposed in the non-display areas on both sides, and at least one gate driver GIA(B) may be disposed within the display area.

In the third region C, two gate drivers GIP(C) may be disposed in the non-display areas on both sides, and at least one gate driver GIA(C) may be disposed within the display area.

The gate drivers GIP(A), GIA(A), GIP(A), GIP(B), GIA (B), GIP(B), GIP(C), GIA(C), and GIP(C) disposed in the regions A, B, and C may have the same configuration as that described in FIG. 6.

In addition, the data driver 400 may commonly apply a data voltage to the data lines DL of the regions A, B, and C. However, the present disclosure is not limited thereto. The data driver 400 may be divided into data drivers 400(DA), 400(DB), and 400(DC) and separately disposed for the respective regions A, B, and C for the data lines DL of the regions A, B, and C, and the data drivers 400(DA), 400(DB), and 400(DC) may apply data voltages to the data lines of the respective regions A, B, and C.

In addition, as shown in FIG. 12, the third region C may be divided in the vertical direction into the (3-1)-th region C' and the (3-2)-th region D'.

The (3-1)-th region C' and the (3-2)-th region D' may be driven by the same gate drivers GIP(C) and GIA(C) and the same data driver 400(DC).

FIG. 12 and FIG. 14 illustrate an example in which the first region A is driven at 60 Hz, the second region B is driven at 90 Hz, the third region C is driven at 60 Hz, and the third region C is divided into the (3-1)-th region C' and the (3-2)-th region D' in the vertical direction, the (3-1)-th region C' is driven at 60 Hz, and the (3-2)-th region D' is driven at 30 Hz.

The method of skipping frames may be applied to driving the regions A, B, and C in the horizontal direction using separate frequencies, as shown in FIG. 12 and FIG. 14.

For example, as illustrated in FIG. 12 and FIG. 14, in the second region B driven at 90 Hz, there is no skipped frame. That is, the data driver 400(DB) supplies a data voltage B1 to B90 of 90 frames per second to the data lines of the second region B under the control of the controller 200. Then, the controller 200 provides the start signal VST having a low level to the gate driver GIP(B) for driving the second region B at the start of each frame (the second period t2 described in FIG. 7). Accordingly, the gate driver GIP(B) for driving the second region B sequentially outputs scan signals to the gate lines of the second region B according to the start signal VST, as described in FIG. 7. Therefore, the second region B can be driven at 90 Hz to display an image.

As shown in FIG. 12 and FIG. 14, in the first region A and the third region C driven at 60 Hz, 3k-th frames are skipped. That is, the data driver 400(DA) and the data driver 400(DC) supply data voltages A1 to A60 and C1 to C60 of 60 frames per second to the data lines of the first region A and the data lines of the third region C under the control of the controller 200, respectively. That is, the data voltage Vdata is not output in the 3k-th frames, or the data voltage of the previous frame is held according to the frame skipping method.

In (3k-2)-th and (3k-1)-th frames, the controller 200 provides the start signal VST having a low level to the gate drivers GIP(A) and GIA(A) for driving the first region A and the gate drivers GIP(C) and GIA(C) for driving the third region C at the start of the frames (the second period t2 described in FIG. 7), and in the 3k-th frames, the controller 200 does not provide the start signal VST having a low level to the gate drivers GIP(A) and GIA(A) for driving the first region A and the gate drivers GIP(C) and GIA(C) for driving the third region C at the start of the frames (the second period t2 described in FIG. 7), but provides the start signal VST having a high level to the gate drivers GIP(A) and GIA(A) for driving the first region A and the gate drivers GIP(C) and GIA(C) for driving the third region C at the start of the frames (the second period t2 described in FIG. 7). Accordingly, the 3k-th frames are skipped and the first region A and the third region C can be driven at 60 Hz to display an image.

Meanwhile, a method of driving the (3-1)-th region C' and the (3-2)-th region D' separated in the vertical direction using separate frequencies will be described below.

As described above, the (3-1)-th region C' and the (3-2)-th region D' separated in the vertical direction may be driven by the same gate driver GIP(C) and the same data driver 400(DC).

As illustrated in FIG. 12, in the third region C, the region from the first gate line GL1 to the GLn-th gate line GLn may be defined as the (3-1)-th region C', and the region from the GL(n+1)-th gate line GL(n+1) to the last gate line GL last may be defined as the (3-2)-th region D' in the vertical direction. In addition, the (3-1)-th region C' may be driven at 60 Hz, and the (3-2)-th region D' may be driven at 30 Hz.

The (3-1)-th region C' and the (3-2)-th region D' separated in the vertical direction may be driven with separate frequencies using the start signal VST and the reset signal QRST.

The data driver 400(DC) supplies a data voltage C1 to C60 of 60 frames per second and a data voltage D1 to D30 of 30 frames per second to the data lines of the (3-1)-th region C' under the control of the controller 200.

That is, as illustrated in FIG. 14, in the (3k-2)-th frames, the data driver 400(DC) may initially provide the data voltage (one of C1 to C60) of the (3-1)-th region C' to the data lines of the third region C and provide the data voltage (one of D1 to D30) of the (3-2)-th region D' to the data lines of the third region C later.

In the (3k-2)-th frames, the controller 200 may provide the start signal VST having a low level to the gate driver GIP(C) at the start of the frames (the second period t2 described in FIG. 7). Accordingly, as illustrated in FIG. 13A, the gate driver GIP(C) sequentially outputs scan signals Scan1 and Scan2 to the gate lines GL1 to GLn of the (3-1)-th region C' and the gate lines GL (n+1) to GL last of the (3-2)-th region D'.

Therefore, in the (3k-2)-th frames, images input to the (3-1)-th region C' and the (3-2)-th region D' are displayed.

In the (3k-1)-th frames, as illustrated in FIG. 14, the data driver 400(DC) initially provides the data voltage (one of C1 to C60) of the (3-1)-th region C' to the data lines of the third region C, and does not provide the data voltage D1 to D30 of the (3-2)-th region D' to the data lines of the third region C later.

In addition, in the (3k-1)-th frames, the controller 200 provides the start signal VST having a low level to the gate driver GIP(C) at the start of the frames (the second period t2 described in FIG. 7). Then, the controller 200 provides the reset signal QRST having a low level to the gate driver GIP(C) right before the time when the GL(n+1)-th gate line GL(n+1) of the (3-2)-th region D' is driven.

Therefore, as illustrated in FIG. 13B, the gate driver GIP(C) sequentially outputs the scan signals Scan1 and Scan2 to the gate lines GL1 to GLn of the (3-1)-th region C'. However, the gate driver GIP(C) does not output the scan signals Scan1 and Scan2 to the gate lines GL(n+1) to GL last of the (3-2)-th region D'.

Therefore, in the (3k-1)-th frames, the input image is displayed in the (3-1)-th region C', and the image of the previous frame is display in the (3-2)-th region D' since the scan signals are not input to the (3-2)-th region D' and the data voltage is not applied thereto.

In the 3k-th frames, as illustrated in FIG. 14, the data driver 400(DC) does not provide the data voltage of the (3-1)-th region C' and the data voltage of the (3-2)-th region D' to the data lines of the third region C.

In addition, in the 3k-th frames, the controller 200 does not provide the start signal VST having a low level to the gate drivers GIP(C) and GIA(C) for driving the third region C at the start of the frames (the second period t2 described in FIG. 7), but provides the start signal VST having a high level to the gate drivers GIP(C) and GIA(C) for driving the third region C at the start of the frames (the second period t2 described in FIG. 7). Then, the controller 200 provides the reset signal QRST having a low level to the gate drivers GIP(C) and GIA(C).

Therefore, as illustrated in FIG. 13C, the gate drivers GIP(C) and GIA(C) do not output the scan signals Scan1 and Scan2 to the gate lines GL1 to GLn of the (3-1)-th region C' and the gate lines GL(n+1) to GL last of the (3-2)-th region D'. Accordingly, the 3k-th frames are skipped in the third region C and thus the image of the previous frame is displayed in the third region C.

As described above, the (3-1)-th region C' and the (3-2)-th region D' separated in the vertical direction can be driven by separate frequencies. That is, the (3-1)-th region C' and the (3-2)-th region D' separated in the vertical direction use the same gate driver GIP(C), and the (3-1)-th region C' can be driven at 60 Hz and the (3-2)-th region D' can be driven at 30 Hz using the start signal VST and the reset signal QRST.

According to the present disclosure as described above, the display panel can be divided into upper, lower, left, and right regions depending on characteristics of an image to be displayed, and the regions can be driven separately using driving frequencies suitable for the functions of the respective regions, thereby improving the display quality.

According to the present disclosure, when the display panel is divided into left and right regions, the gate lines may be separated by regions and controlled by the start signal VST to drive the regions using multiple frequencies, and when the display panel is divided into upper and lower regions, the gate lines are controlled by the QRST signal to drive the regions using multiple frequencies, and thus there is no need to physically change the gate driver for each region.

According to the present disclosure, since there is no need to physically change the gate driver for each region, production energy for producing a display apparatus can be reduced, and greenhouse gas emissions that may be generated due to the manufacturing process can be reduced, thereby achieving ESG (Environmental/Social/Governance) goals.

The display apparatus according to various embodiments of the present disclosure may be described as follows.

The display apparatus according to an embodiment of the present disclosure may include a display panel in which a plurality of data lines, a plurality of gate lines, and a plurality of pixels are arranged, and the plurality of gate lines is divided into at least two regions and are separately driven in up, down, left, and right directions, at least two gate drivers that supply scan signals at different frequencies to the plurality of gate lines of the divided regions, a data driver that supplies data signals to the plurality of data lines, and a controller that controls the at least two gate drivers such that the at least two gate drivers output scan signals at different frequencies.

According to the present disclosure, the at least two gate drivers may have the same configuration.

According to the present disclosure, the controller may provide a start signal and a reset signal to each of the at least two gate drivers, and the at least two gate drivers may output a plurality of scan signals at different frequencies according to the start signal and the reset signal.

According to the present disclosure, the at least two gate drivers may include two gate drivers, the first gate driver may drive gate lines of a relevant region at a frequency A, the second gate driver may drive gate lines of a relevant region at a frequency B lower than the frequency A, and the controller may control the second gate driver using the start signal such that the second gate driver skips arbitrary frames.

According to the present disclosure, the controller may not provide the start signal to the second gate driver during periods of the skipped frames.

According to the present disclosure, one of the at least two regions may be divided into at least two regions in the vertical direction, and the at least two regions divided in the vertical direction may be driven with different frequencies by the same gate driver.

According to the present disclosure, the controller may drive the at least two regions divided in the vertical direction with different frequencies using the reset signal.

According to the present disclosure, the at least two regions divided in the vertical direction may include a third region and a fourth region, gate lines of the third region may be driven at a frequency C, gate lines of the fourth region may be driven at a frequency D lower than the frequency C, and the controller may control the fourth region using the reset signal such that arbitrary frames are skipped.

According to the present disclosure, the controller may output the reset signal as an enable signal such that a scan signal is not provided to the gate lines of the fourth region during periods of the skipped frames.

According to the present disclosure, the at least two gate drivers may include a plurality of stages connected in cascade, and each stage may include a first output transistor that outputs one of a plurality of clock signals to an output terminal in response to a signal of a Q node, a second output transistor that outputs a gate high voltage to the output terminal in response to a signal of a QB node, a Q node controller that controls a voltage of the Q node using the start signal, the reset signal, and a gate low voltage, and a QB node controller that controls a voltage of the QB node using the start signal, the reset signal, another one of the plurality of clock signals, and the gate low voltage.

According to the present disclosure, the Q node controller may include a transfer transistor that transfers a voltage of a Q1 node to the Q node in response to the gate low voltage, a first transistor that provides the gate low voltage to the Q1 node in response to the start signal or an output signal of a previous stage, a second transistor that provides the gate high voltage to the Q1 node in response to the reset signal, and a third transistor that provides the gate high voltage to the Q1 node in response to the signal of the QB node.

According to the present disclosure, the QB node controller may include a fourth transistor that provides the gate low voltage to the QB node in response to the reset signal, a fifth transistor that provides the gate high voltage to the QB node in response to the start signal or the output signal of the previous stage, a sixth transistor that provides the gate high voltage to the QB node in response to the voltage of the Q1 node, and a seventh transistor that provides the gate low voltage to the QB node in response to the other clock signal.

According to the present disclosure, the display panel is divided into upper, lower, left, and right regions depending on display characteristics and driven using a driving frequency suitable for the function of each region, and thus the display quality can be improved.

According to the present disclosure, if the display panel is divided into left and right regions, gate lines are separated by regions and controlled by a start signal VST to drive the display panel using multiple frequencies, and if the display panel is divided into upper and lower regions, the gate lines are controlled by a QRST signal to drive the display panel using multiple frequencies, and thus there is no need to physically change the gate driver for each region.

According to the present disclosure, since there is no need to physically change the gate driver for each region, the production energy for producing the display apparatus can be reduced, and greenhouse gases that may be generated due to the manufacturing process can be reduced, and thus ESG (Environmental/Social/Governance) goals can be achieved.

The effects according to the embodiments are not limited to the above description, and more diverse effects are included in the present disclosure.

The present disclosure described above is not limited to the above-described embodiments and the attached drawings, and it will be apparent to a person skilled in the art to which the present disclosure pertains that various substitutions, modifications, and changes are possible without departing from the technical spirit of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display apparatus comprising:

a display panel in which a plurality of data lines, a plurality of gate lines, and a plurality of pixels are arranged, wherein the plurality of gate lines is divided into at least two regions configured to be separately driven;

at least two gate drivers configured to supply scan signals at different frequencies to the plurality of gate lines of the at least two regions;

a data driver configured to supply data signals to the plurality of data lines; and a controller configured to control the at least two gate drivers such that the at least two gate drivers output scan signals at different frequencies, wherein the at least two gate drivers include a first gate driver and a second gate driver, the first gate driver is configured to drive gate lines of a relevant region at a first frequency, and the second gate driver is configured to drive gate lines of a relevant region at a second frequency lower than the first frequency, and wherein the controller is configured to control the second gate driver to skip an arbitrary frame.

2. The display apparatus of claim 1, wherein the at least two gate drivers have a same configuration.

3. The display apparatus of claim 1, wherein the controller is configured to provide a start signal and a reset signal to each of the at least two gate drivers, and the at least two gate drivers are configured to output a plurality of scan signals at different frequencies according to the start signal and the reset signal.

4. The display apparatus of claim 3, wherein one of the at least two regions is divided into at least two regions in a vertical direction, and wherein the at least two regions divided in the vertical direction are configured to be driven with different frequencies by the same gate driver.

5. The display apparatus of claim 4, wherein the controller is configured to drive the at least two regions divided in the vertical direction with different frequencies using the reset signal.

6. The display apparatus of claim 4, wherein the at least two regions divided in the vertical direction include a third region and a fourth region, gate lines of the third region are configured to be driven at a third frequency, and gate lines of the fourth region are configured to be driven at a fourth frequency lower than the third frequency, and wherein the controller is configured to control the fourth region using the reset signal such that arbitrary frames are skipped.

7. The display apparatus of claim 6, wherein the controller is configured to output the reset signal as an enable signal such that a scan signal is not provided to the gate lines of the fourth region during periods of the skipped frames.

8. The display apparatus of claim 3, wherein the at least two gate drivers include a plurality of cascadedly connected stages, wherein each stage comprises:

a first output transistor configured to output one of a plurality of clock signals to an output terminal in response to a signal of a Q node;

a second output transistor configured to output a gate high voltage to the output terminal in response to a signal of a QB node;

a Q node controller configured to control a voltage of the Q node using the start signal, the reset signal, and a gate low voltage; and a QB node controller configured to control a voltage of the QB node using the start signal, the reset signal, another one of the plurality of clock signals, and the gate low voltage.

9. The display apparatus of claim 8, wherein the Q node controller comprises:

a transfer transistor configured to transfer a voltage of a Q1 node to the Q node in response to the gate low voltage;

a first transistor configured to provide the gate low voltage to the Q1 node in response to the start signal or an output signal of a previous stage;

a second transistor configured to provide the gate high voltage to the Q1 node in response to the reset signal; and a third transistor configured to provide the gate high voltage to the Q1 node in response to the signal of the QB node.

10. The display apparatus of claim 8, wherein the QB node controller comprises:

a fourth transistor configured to provide the gate low voltage to the QB node in response to the reset signal;

a fifth transistor configured to provide the gate high voltage to the QB node in response to the start signal or the output signal of the previous stage;

a sixth transistor configured to provide the gate high voltage to the QB node in response to the voltage of the Q1 node; and a seventh transistor configured to provide the gate low voltage to the QB node in response to the another one clock signal.

11. The display apparatus of claim 3, wherein each of the at least two gate drivers comprises emission control signal generators for outputting an emission control signal and scan signal generators for outputting the plurality of scan signals.

12. The display apparatus of claim 1, wherein the controller is configured not to provide the start signal to the second gate driver during periods of the skipped frames.

13. The display apparatus of claim 1, wherein the at least two regions comprise left and right regions divided in a horizontal direction, and the plurality of gate lines of the left region and the plurality of gate lines of the right region are configured to be driven with separate frequencies.

14. The display apparatus of claim 13, wherein one of the left and right regions comprises upper and lower regions divided in the vertical direction, and a plurality of gate lines of the upper region and a plurality of gate lines of the lower region are configured to be driven with separate frequencies.

15. A display apparatus comprising:

a display panel in which a plurality of data lines, a plurality of gate lines, and a plurality of pixels are arranged, wherein the plurality of gate lines is divided into at least two regions configured to be separately driven;

at least two gate drivers configured to supply scan signals at different frequencies to the plurality of gate lines of the at least two regions;

a data driver configured to supply data signals to the plurality of data lines; and a controller configured to control the at least two gate drivers such that the at least two gate drivers output scan signals at different frequencies, wherein the at least two gate drivers each include a plurality of cascadedly connected stages, wherein each stage comprises:

a first output transistor configured to output one of a plurality of clock signals to an output terminal in response to a signal of a Q node;

a second output transistor configured to output a gate high voltage to the output terminal in response to a signal of a QB node;

a Q node controller configured to control a voltage of the Q node using a start signal, a reset signal, and a gate low voltage; and a QB node controller configured to control a voltage of the QB node using the start signal, the reset signal, another one of the plurality of clock signals, and the gate low voltage.

16. The display apparatus of claim 15, wherein the Q node controller comprises:

a transfer transistor configured to transfer a voltage of a Q1 node to the Q node in response to the gate low voltage;

a first transistor configured to provide the gate low voltage to the Q1 node in response to the start signal or an output signal of a previous stage;

a second transistor configured to provide the gate high voltage to the Q1 node in response to the reset signal; and a third transistor configured to provide the gate high voltage to the Q1 node in response to the signal of the QB node.

17. The display apparatus of claim 15, wherein the QB node controller comprises:

a fourth transistor configured to provide the gate low voltage to the QB node in response to the reset signal;

a fifth transistor configured to provide the gate high voltage to the QB node in response to the start signal or the output signal of the previous stage;

a sixth transistor configured to provide the gate high voltage to the QB node in response to the voltage of the Q1 node; and a seventh transistor configured to provide the gate low voltage to the QB node in response to the another one clock signal.

18. A gate driver circuitry comprising a plurality of cascadedly connected stages, wherein each stage comprises:

a first output transistor configured to output one of a plurality of clock signals to an output terminal in response to a signal of a Q node;

a second output transistor configured to output a gate high voltage to the output terminal in response to a signal of a QB node;

a Q node controller configured to control a voltage of the Q node using a start signal, a reset signal, and a gate low voltage; and a QB node controller configured to control a voltage of the QB node using the start signal, the reset signal, another one of the plurality of clock signals, and the gate low voltage.

19. The gate driver circuitry of claim 18, wherein the Q node controller comprises:

a transfer transistor configured to transfer a voltage of a Q1 node to the Q node in response to the gate low voltage;

a first transistor configured to provide the gate low voltage to the Q1 node in response to the start signal or an output signal of a previous stage;

a second transistor configured to provide the gate high voltage to the Q1 node in response to the reset signal; and a third transistor configured to provide the gate high voltage to the Q1 node in response to the signal of the QB node.

20. The gate driver circuitry of claim 18, wherein the QB node controller comprises:

a fourth transistor configured to provide the gate low voltage to the QB node in response to the reset signal;

a fifth transistor configured to provide the gate high voltage to the QB node in response to the start signal or the output signal of the previous stage;

a sixth transistor configured to provide the gate high voltage to the QB node in response to the voltage of the Q1 node; and a seventh transistor configured to provide the gate low voltage to the QB node in response to the another one clock signal.

* * * * *